(12) United States Patent
Okubo et al.

(10) Patent No.: US 8,203,322 B2
(45) Date of Patent: Jun. 19, 2012

(54) DC-DC CONVERTER

(75) Inventors: Toshikazu Okubo, Hitachi (JP); Takae Shimada, Hitachi (JP); Hiroyuki Shoji, Hitachi (JP); Junpei Uruno, Tokai (JP)

(73) Assignee: Hitachi, Ltd., Tokyo (JP)

( * ) Notice: Subject to any disclaimer, the term of this patent is extended or adjusted under 35 U.S.C. 154(b) by 398 days.

(21) Appl. No.: 12/544,160

(22) Filed: Aug. 19, 2009

(65) Prior Publication Data

US 2010/0061122 A1    Mar. 11, 2010

(30) Foreign Application Priority Data

Sep. 10, 2008    (JP) .................................. 2008-232365

(51) Int. Cl.
  *G05F 1/40*    (2006.01)
(52) U.S. Cl. ......................................................... 323/285
(58) Field of Classification Search .................. 323/272, 323/282–285, 351
  See application file for complete search history.

(56) References Cited

U.S. PATENT DOCUMENTS

| | | | |
|---|---|---|---|
| 5,418,704 A | 5/1995 | Hua et al. | |
| 6,317,341 B1 * | 11/2001 | Fraidlin et al. | 363/56.09 |
| 6,587,359 B2 * | 7/2003 | Raets et al. | 363/24 |
| 7,049,793 B2 | 5/2006 | Itoh et al. | |
| 7,557,546 B2 * | 7/2009 | Uruno et al. | 323/259 |
| 7,592,789 B2 * | 9/2009 | Jain | 323/276 |
| 7,777,461 B2 * | 8/2010 | Martin et al. | 323/272 |
| 7,782,032 B2 * | 8/2010 | Taufik et al. | 323/272 |
| 7,852,053 B2 * | 12/2010 | Martin et al. | 323/272 |
| 2007/0236966 A1 | 10/2007 | Uruno et al. | |

FOREIGN PATENT DOCUMENTS

JP    2002-101645    4/2002

OTHER PUBLICATIONS

G. Hua et al., "Novel Zero-Voltage-Transition PWM Converters," IEEE Transactions on Power Electronics, vol. 9, No. 2, Mar. 1994, pp. 213-219.

* cited by examiner

*Primary Examiner* — Adolf Berhane
(74) *Attorney, Agent, or Firm* — Foley & Lardner LLP

(57) ABSTRACT

A small and efficient DC-DC converter is provided. In this DC-DC converter, passive elements such as an inductor and a capacitor can be reduced in size by reducing switching loss by a soft switching technology and increasing the drive frequency of a switching element. The DC-DC converter has a main switching element, a main diode and an auxiliary circuit that discharges the electric charges of the capacitance between the ends of the main switching element. The DC-DC converter includes an auxiliary inductor magnetically coupled with the main inductor, an auxiliary switching element that stores energy in the auxiliary inductor, and an auxiliary diode that discharges energy stored in the auxiliary inductor to the direct-current power source or the output side. The auxiliary inductor is coupled with the main inductor in the direction in which backward voltage is applied to the auxiliary diode when the main inductor discharges energy.

20 Claims, 14 Drawing Sheets

DC-DC CONVERTER

CLAIM OF PRIORITY

The present application claims priority from Japanese patent application serial No. 2008-232365 filed on Sep. 10, 2008, the content of which is hereby incorporated by reference into this application

BACKGROUND OF THE INVENTION

1. Field of the Invention

The present invention relates to a DC-DC converter that converts the voltage of inputted power to a different voltage.

2. Description of the Related Art

The efficiency of a DC-DC converter that converts the voltage of inputted power to a desired voltage and outputs it can be enhanced by reducing switching loss by a switching technology. In conjunction therewith, such a passive element as an inductor and a capacitor can be reduced in size by increasing the drive frequency of a switching element.

G. Hua et al. "Novel zero-voltage-transition PWM converters" IEEE transactions on Power electoronics, Vol. 9, pp. 213-219, 1994 (Non-patent Document 1), discloses a DC-DC converter that performs soft switching operation. Its circuitry is generally obtained by connecting the following auxiliary resonant circuit to a conventional boost chopper circuit comprised of a main inductor, a main switching element, a main diode, and a load: an auxiliary resonant circuit comprised of a resonant capacitor, a resonant inductor, a saturable inductor, an auxiliary switching element, and an auxiliary diode. The main switching element is caused to perform soft switching operation by the auxiliary resonant circuit.

When a series circuit of the saturable inductor and the diode is removed from the components of the auxiliary resonant circuit in the circuit described in Non-patent Document 1, the following takes place: the auxiliary diode recovers and this increases loss in the auxiliary diode and the auxiliary switching element. To avoid this, use of the series circuit of the saturable inductor and the diode is indispensable in the circuit described in Non-patent Document 1.

For the above reason, in the circuit described in Non-patent Document 1, loss in the auxiliary diode and the auxiliary switching element is suppressed by the series circuit of the saturable inductor and the diode. However, loss caused by the passage of current through the series circuit of the saturable inductor and the diode exists and thus the significant enhancement of efficiency cannot be expected. In addition, in the auxiliary resonant circuit for causing the main switching element to perform soft switching operation, two inductors, the resonant inductor and the saturable inductor, must be used as windings and this make it difficult to reduce circuit size.

It is an object of the invention to provide a small and efficient DC-DC converter that does not use a series circuit of a saturable inductor and a diode.

It is another object of the invention to provide a DC-DC converter that makes it possible to adopt an inductor of a relatively small capacity as an auxiliary inductor and thus reduce size and weight.

SUMMARY OF THE INVENTION

The invention is an DC-DC converter including: a main switching element that stores energy from a direct-current power source in a main inductor; a main diode that discharges the energy stored in the main inductor to the output side; and an auxiliary circuit that discharges the electric charges of the capacitance between the ends of the main switching element in a short time including time when the main switching element is turned on, wherein the auxiliary circuit includes: an auxiliary inductor magnetically coupled with the main inductor, an auxiliary switching element that stores energy in the auxiliary inductor, and an auxiliary diode that discharges the energy stored in the auxiliary inductor to the direct-current power source or the output side; and the auxiliary inductor is coupled with the main inductor in the direction in which backward voltage is applied to the auxiliary diode when the main inductor discharges energy.

In this invention, it is preferable that the DC-DC converter includes a smoothing capacitor that stores the energy of the main inductor and a smoothing inductor that discharges the energy stored in the smoothing capacitor to the output side; and the smoothing capacitor is located on the path through which the energy stored in the auxiliary inductor is discharged.

Further, In this invention, it is preferable that the main inductor, auxiliary inductor, and smoothing inductor have such a winding structure that one-side terminals of these inductors are at the same potential; and the smoothing inductor is coupled in the direction in which energy is discharged to the output side when the main inductor discharges energy.

The invention is a DC-DC converter having an auxiliary circuit. The auxiliary circuit includes: an auxiliary inductor magnetically coupled with a main inductor; an auxiliary switching element that stores energy in the auxiliary inductor; and an auxiliary diode that discharges the energy stored in the auxiliary inductor to a direct-current power source or the output side. The auxiliary inductor is coupled with the main inductor in the direction in which backward voltage is applied to the auxiliary diode when the main inductor discharges energy. This makes it possible to provide a small and efficient DC-DC converter that does not use a saturable inductor. In addition, a DC-DC converter that makes it possible to adopt an inductor of a relatively small capacity as an auxiliary inductor and thus significantly reduce size and weight as compared with conventional examples can be provided.

DETAILED DESCRIPTION OF THE PREFERRED EMBODIMENTS

Hereafter, description will be given to embodiments of the invention with reference to the drawings.

First Embodiment

Figure 1:
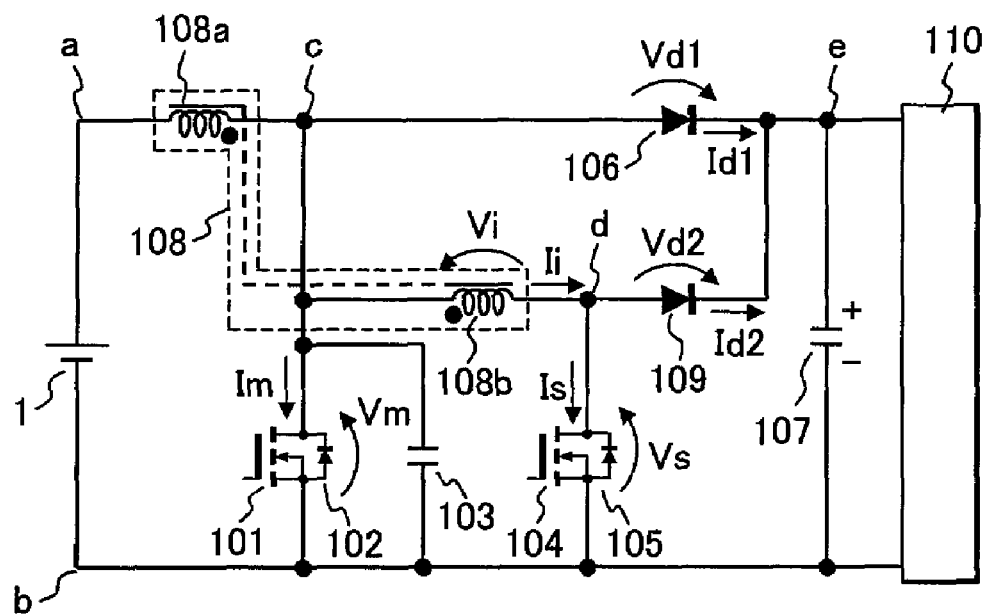
FIG. 1 is a circuitry diagram of a DC-DC converter in a first embodiment of the invention.

FIG. 1 is a circuitry diagram of a DC-DC converter in a first embodiment of the invention. This embodiment is a boost soft switching DC-DC converter that makes it possible to obtain an output voltage higher than input voltage.

Hereafter, description will be given to the circuitry in FIG. 1. First, a direct-current power source 1 is connected with a series circuit of a main inductor 108a and MOSFET 101 as a main switching element. This main MOSFET 101 is connected in inverse parallel with a diode 102. To take out output voltage, a series circuit of a main diode 106 and an output capacitor 107 is connected between the ends c and b of the main MOSFET 101. The ends of this output capacitor 107 are the output terminals of the DC-DC converter and are connected with a load 110.

Above is the description of the positional configuration of a common DC-DC converter and an auxiliary circuit of the invention is connected thereto.

The auxiliary circuit is obtained by: connecting a series circuit of an auxiliary inductor 108b and MOSFET 104 as an auxiliary switching element and a snubber capacitor 103 in parallel between the ends c and b of the MOSFET 101 as a main switching element; and connecting an auxiliary diode 109 between the junction point d between this auxiliary inductor 108b and the auxiliary MOSFET 104 and the junction point e between the main diode 106 and the output capacitor 107. Further, the auxiliary inductor 108b is magnetically coupled with the main inductor 108a. The direction of this coupling is the direction in which the auxiliary inductor 108b applies backward voltage to the auxiliary diode 109 when the main inductor 108a discharges energy to the output side. A diode 105 is connected in inverse parallel between the ends of the auxiliary MOSFET 104.

(Operation Performed when Inductors are not Magnetically Coupled)

Description will be given to the operation of the DC-DC converter in FIG. 1. First, description will be given to a case where the main inductor 108a and the auxiliary inductor 108b are not magnetically coupled with each other as a comparative example. This operation is equivalent to the operation of the basic circuit introduced in Non-patent Document 1.

Figure 2:
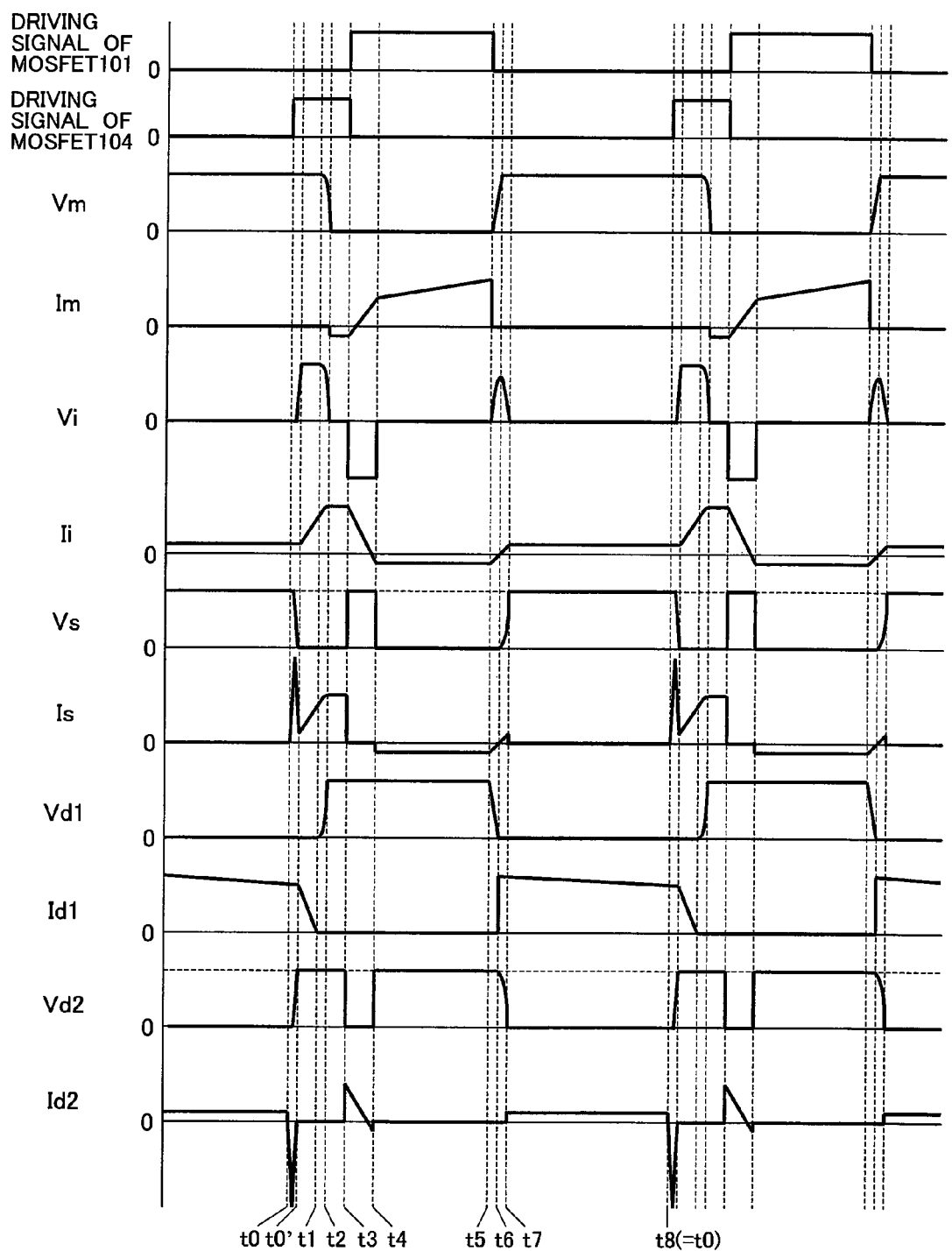
FIG. 2 is a voltage and current waveform diagram obtained when inductors are not magnetically coupled in the DC-DC converter in FIG. 1.

FIG. 2 is a voltage and current waveform diagram of each part obtained when the main inductor 108a and the auxiliary inductor 108b are not magnetically coupled with each other in the example in FIG. 1. Hereafter, description will be given to circuit operation with reference to FIG. 2.

Before time t0, a driving signal is not applied to the gate of the main MOSFET 101 or the auxiliary MOSFET 104 and both the MOSFETs are in off state. At this time, a current is flowing from the direct-current power source 1 in the loop of the main inductor 108a→the main diode 106→the output capacitor 107. The current Ii of the auxiliary inductor 108b is flowing in the direction from point c to point d and this current flows to the output capacitor 107 (including the load 110) via the auxiliary diode 109. That is, the current of the inductor 108a is shunted to the main diode 106 side and the side of the series circuit of the auxiliary inductor 108b and the auxiliary diode 109.

When the driving signal of the auxiliary MOSFET 104 is subsequently turned on at time t0, voltage is applied to both ends of the auxiliary diode 109 by the output capacitor 107. For this reason, while the auxiliary diode 109 recovers, a recovery current flows in the loop of the output capacitor 107→the auxiliary diode 109→the auxiliary MOSFET 104. In the above loop, a large impedance component such as inductance or resistance does not exist. In addition, before time t0, a forward current flows in the auxiliary diode 109 and some time is required for the reverse recovery of the auxiliary diode 109. For this reason, the recovery current becomes an overcurrent like that produced when a voltage source is short-circuited and thus large loss is produced in the auxiliary diode 109 and the auxiliary MOSFET 104.

When the recovery of the auxiliary diode 109 is completed at time t0', the current Ii of the auxiliary inductor 108b is gently increased (the auxiliary inductor 108b stores energy) and the current Id1 of the main diode 106 is gently reduced. This is because the current Ii of the auxiliary inductor 108b is made gentle in di/dt by the inductance of the auxiliary inductor 108b. For this reason, the main diode 106 can be gently turned off at time t1 and recovery loss is hardly produced.

From time t1, subsequently, the electric charges charged in the parasitic capacitance between the source and the drain of the main MOSFET 101 and the snubber capacitor 103 are discharged via the auxiliary inductor 108b and the auxiliary MOSFET 104. (That is, energy is stored in the auxiliary inductor 108b.) At time t2, the voltage Vm of the main MOSFET 101 drops to 0V.

From time t2, subsequently, the auxiliary inductor 108b passes current Is in the loop of the auxiliary inductor 108b→the auxiliary MOSFET 104→the diode 102 by the energy stored during the period from time t0 to time t2. At time t3, subsequently, the driving signal of the main MOSFET 101 is turned on and the driving signal of the auxiliary MOSFET 104 is turned off. Either of turn-on of the main MOSFET 101 and turn-off of the auxiliary MOSFET 104 may be carried out first as long as they are carried out during the period during which a current is flowing in the diode 102. This period includes time t2 immediately after the voltage Vm of the main MOSFET 101 drops to 0V. This makes it possible for the main MOSFET 101 to carry out zero-voltage switching (hereafter, referred to as ZVS) and zero-current switching (hereafter, referred to as ZCS) Thus switching loss arising from turn-on of the main MOSFET 101 is not produced. When the period from time t2 to time t3 is made shorter, the period during which current is passed through the diode 102 is shortened and the production of loss can be reduced.

When the driving signal of the auxiliary MOSFET 104 is turned off at time t3, the current Im of the main MOSFET 101 conversely starts to increase. The auxiliary inductor 108b passes auxiliary diode current Id2 in the loop of the auxiliary inductor 108b→the auxiliary diode 109→the output capacitor 107→the main MOSFET 101 by the energy stored in itself. The energy stored in the auxiliary inductor 108b is discharged to the load side by the above-mentioned operation and simultaneously the auxiliary diode current Id2 is reduced. When the energy is completely discharged, the auxiliary diode current Id2 is zeroed and thereafter, the auxiliary diode 109 enters a reverse recovery period and a recovery current flows. This recovery current flows in the loop of the output capacitor 107→the auxiliary diode 109→the auxiliary inductor 108b→the main MOSFET 101. Since the auxiliary inductor 108b exists on the loop, the recovery current does not become as large as produced at time t0.

At time t4, subsequently, the recovery of the auxiliary diode 109 is completed and the auxiliary diode 109 is rendered non-conductive. Then the current hitherto passed through the auxiliary inductor 108b flows in the loop of the auxiliary inductor 108b→the main MOSFET 101→the diode 105. At the same time a current flows in the loop of the direct-current power source 1→the main inductor 108a→the main MOSFET 101. At this time the voltage of the direct-current power source 1 is applied to the main inductor 108a and its current is increased.

When the gate driving signal of the main MOSFET 101 is subsequently turned off and the current Im of the main MOSFET 101 is interrupted at time t5, the following takes place during the period from time t5 to time t6: the drain-source voltage Vm of the main MOSFET 101 is increased by dv/dt, which is determined by interrupting current, the drain-source parasitic capacitance of the main MOSFET 101, and the capacitance of the snubber capacitor 103. That is, dv/dt of the drain-source voltage of the main MOSFET 101 is made gentle by the drain-source parasitic capacitance of the main MOSFET 101 and the snubber capacitor 103. Then ZVS turn-off of the main MOSFET 101 becomes feasible. This reduces the turn-off loss in the main MOSFET 101. At time t6, thereafter, the drain-source voltage of the main MOSFET 101 becomes equal to the voltage of the output capacitor 107 as output voltage. Then the main diode 106 is rendered conductive and between its ends c and e, voltage positive on the point c side is produced.

When the drain-source voltage of the main MOSFET 101 rises, the voltage is applied to both ends of a series circuit comprised of the auxiliary inductor 108b and the auxiliary MOSFET 104. For this reason, the current Ii of the auxiliary inductor 108b hitherto flowing to the negative side (from point d to point c) is reduced. After the recovery of the diode 105 and charging of the drain-source parasitic capacitance of the auxiliary MOSFET 104, the current of the auxiliary inductor 108b is increased to the positive side (from point c to point d). When the voltage Vs across the auxiliary MOSFET 104 becomes equal to the output voltage at time t7, the auxiliary diode 109 is rendered conductive and forward current flows.

After time t7, the voltage positive at point c, produced between the ends c and e of the main diode 106 is applied to the series circuit of the auxiliary inductor 108b and the auxiliary diode 109. For this reason, the forward current of the auxiliary diode 109 is not reduced and lasts.

As mentioned above, the following takes place when the main inductor 108a and the auxiliary inductor 108b are not magnetically coupled with each other: when the auxiliary MOSFET 104 is turned on at time t0, an excessive recovery current is produced due to the forward current continuously passed through the auxiliary diode 109. Then large loss is produced in the auxiliary diode 109 and the auxiliary MOSFET 104 and further big noise is also produced. Further, in the auxiliary diode 109, loss due to forward current flowing during the period from time t4 to time t5 is also produced. These losses not only prevent the size reduction of the auxiliary diode 109 and the auxiliary MOSFET 104 but also cause degradation in the efficiency of the converter.

(Operation Performed when Inductors are Magnetically Coupled)

Figure 3:
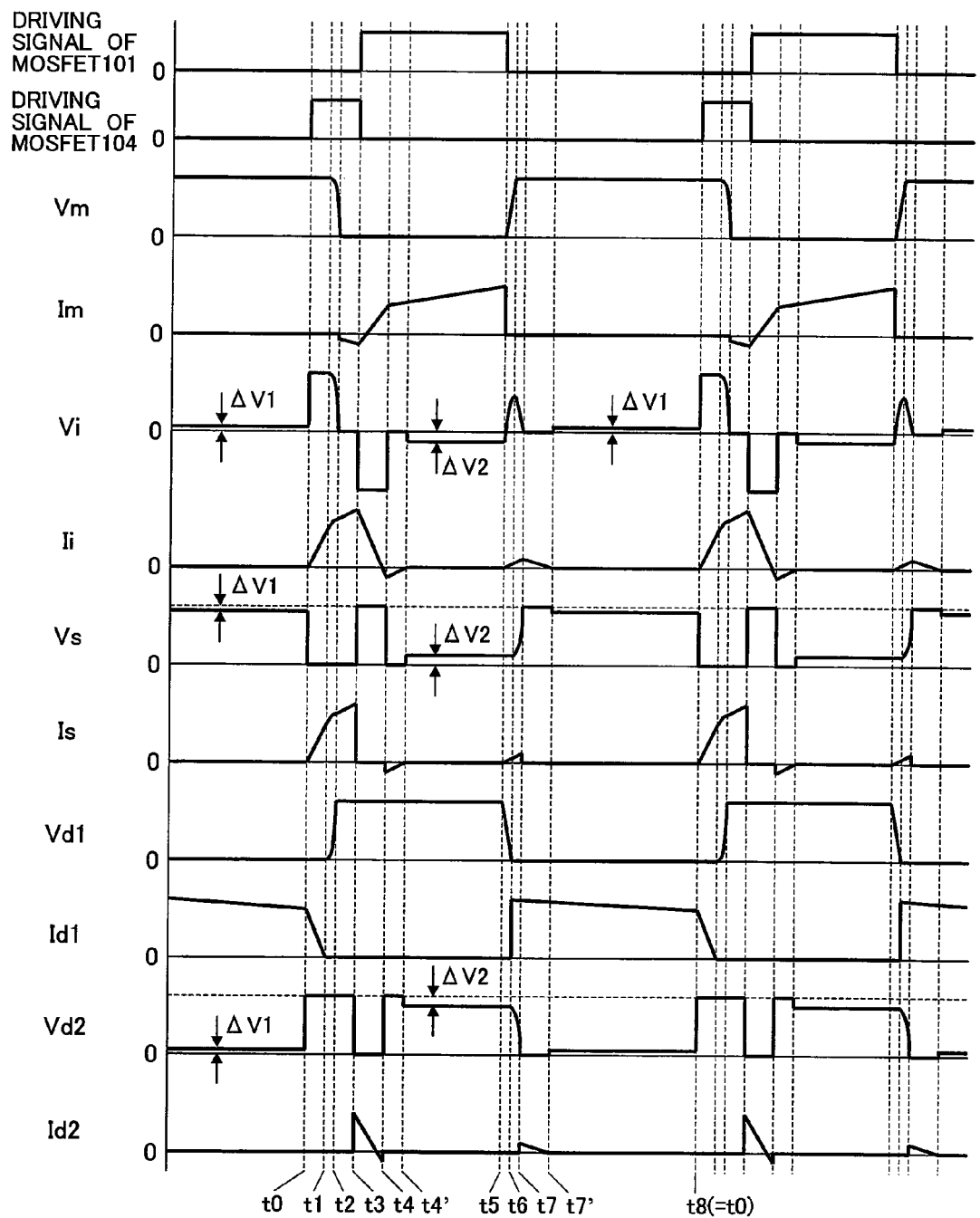
FIG. 3 is a voltage and current waveform diagram obtained when inductors are magnetically coupled in the DC-DC converter in FIG. 1.

Description will be given to the operation performed in this embodiment when the main inductor 108a and the auxiliary inductor 108b are magnetically coupled with each other in the example in FIG. 1. FIG. 3 is a voltage and current waveform diagram of each part obtained when the main inductor 108a and the auxiliary inductor 108b are magnetically coupled with each other in the example in FIG. 1. Hereafter, description will be given to operation with reference to FIG. 3.

Before time t0, a driving signal is not applied to the gate of the main MOSFET 101 or the auxiliary MOSFET 104 and both the MOSFETs are in off state. At this time, a current is flowing from the direct-current power source 1 in the loop of the main inductor 108a→the main diode 106→the output capacitor 107. Between the ends c and a of the main inductor 108a, voltage positive on the point c side has been produced. For this reason, between the ends c and d of the auxiliary inductor 108b magnetically coupled with the main inductor 108a, voltage positive on the point c side is produced and this voltage is applied to between the ends e and d of the auxiliary diode 109 via the main diode 106 so that it is positive on the point e side. That is, the auxiliary diode 109 is reversely biased.

The reverse bias voltage applied to the auxiliary diode 109 is indicated as ΔV1 in FIG. 3. Because of this voltage, the voltage Vs across the auxiliary MOSFET 104 becomes lower by ΔV1 than the voltage (load voltage) between the ends e and b of the output capacitor 107. Meanwhile, forward current is flowing in the main diode 106 in the direction from point c to point e. For this reason, between the ends c and e of the main diode 106, voltage positive on the point c side is produced and this voltage is applied to the series circuit of the auxiliary inductor 108b and the auxiliary diode 109. As mentioned above, however, between the ends c and d of the auxiliary inductor 108b, voltage positive on the point c side is produced and reversely biases the auxiliary diode 109. Therefore, the current Id2 of the auxiliary diode 109 does not flow.

At time t0, subsequently, the driving signal of the auxiliary MOSFET 104 is turned on. Since forward current is not passed through the auxiliary diode 109 before time t0, the auxiliary diode 109 does not recover. When the auxiliary MOSFET 104 is turned on at time t0, the current Ii of the auxiliary inductor 108b is gently increased and the current Id1 of the main diode 106 is gently reduced. Therefore, the auxiliary MOSFET 104 carries out ZCS when it is turned on and the production of loss is reduced.

The subsequent operation performed during the period from time t1 to time t4 is the same as in cases where the main inductor 108a and the auxiliary inductor 108b are not magnetically coupled with each other, indicated in FIG. 2.

At time t4, subsequently, the recovery of the auxiliary diode 109 is completed and the auxiliary diode 109 is rendered non-conductive. Then the current hitherto passed through the auxiliary inductor 108b flows in the loop of the auxiliary inductor 108b→the main MOSFET 101→the diode 105. In the auxiliary inductor 108b magnetically coupled with the main inductor 108a, voltage positive on the point d side is produced and this voltage is applied to the leakage inductance component of the auxiliary inductor 108b. As a result, the current passed through the auxiliary inductor 108b is reduced and zeroed at time t4'. After time t4', the voltage produced in the auxiliary inductor 108*b* is applied to the auxiliary MOSFET 104. This voltage is indicated as ΔV2 in FIG. 3. To the auxiliary diode 109, a voltage obtained by subtracting the voltage ΔV2 from the voltage of the output capacitor 107 is applied. At the same time, a current flows in the loop of the direct-current power source 1→the main inductor 108*a*→the main MOSFET 101. At this time, the voltage of the direct-current power source 1 is applied to the main inductor 108*a* and its current is increased.

The subsequent operation performed during the period from time t5 to time t7 is the same as in cases where the main inductor 108*a* and the auxiliary inductor 108*b* are not magnetically coupled with each other, indicated in FIG. 2. At time t7, the current of the inductor 108*a* is shunted to the main diode 106 side and the side of the series circuit of the auxiliary inductor 108*b* and the auxiliary diode 109. That is, forward current is passed through the auxiliary diode 109.

At time t7, subsequently, in the auxiliary inductor 108*b* magnetically coupled with the main inductor 108*a*, voltage positive on the point c side is produced and this voltage is applied to the leakage inductance component of the auxiliary inductor 108*b*. As a result, the current hitherto passed through the auxiliary inductor 108*b* is reduced and zeroed at time t7'. The operation after time t7' is the same as the above-mentioned operation before time t0.

Figure 4:
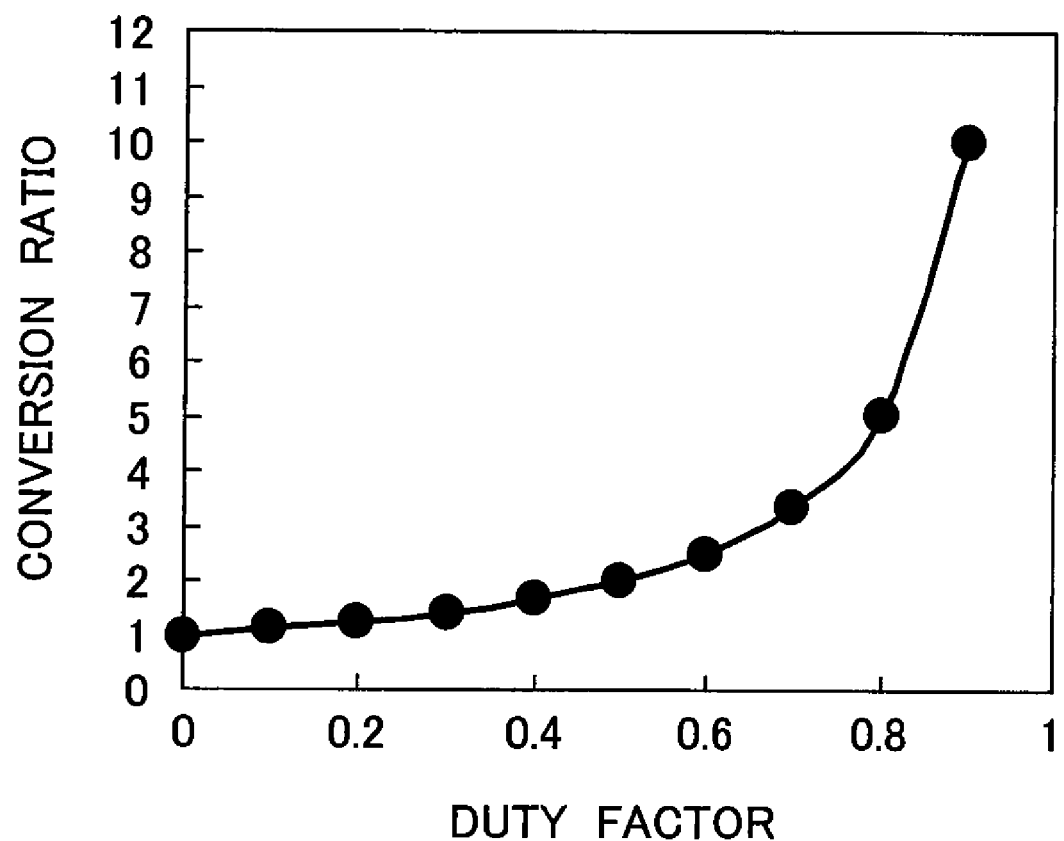
FIG. 4 is an explanatory drawing explaining the operation of the DC-DC converter in FIG. 1.

FIG. 4 is a graph indicating the relation of the boost-buck ratio to the duty factor of the main MOSFET 101. The boost-buck ratio cited here refers to the ratio of input voltage to output voltage. A boost-buck ratio less than 1.0 represents buck operation and a boost-buck ratio not less than 1.0 represents boost operation. According to FIG. 4, the boost-buck ratio in this embodiment is not less than 1.0 and the DC-DC converter in this embodiment has the functions of a boost converter.

According to this embodiment, as mentioned above, the auxiliary circuit comprised of the auxiliary inductor 108*b* magnetically coupled with the main inductor 108*a*, the auxiliary MOSFET 104, the auxiliary diode 109, and the snubber capacitor 103 is provided. As a result, ZVS turn-on, ZCS turn-on, and ZVS turn-off can be implemented with respect to the main MOSFET 101 and ZCS turn-on can be implemented with respect to the auxiliary MOSFET 104. This makes it possible to significantly reduce circuit loss. Especially, since switching loss can be significantly reduced, it is possible to enhance the frequency and reduce the size and cost of inductors and capacitors.

Second Embodiment

Figure 5:
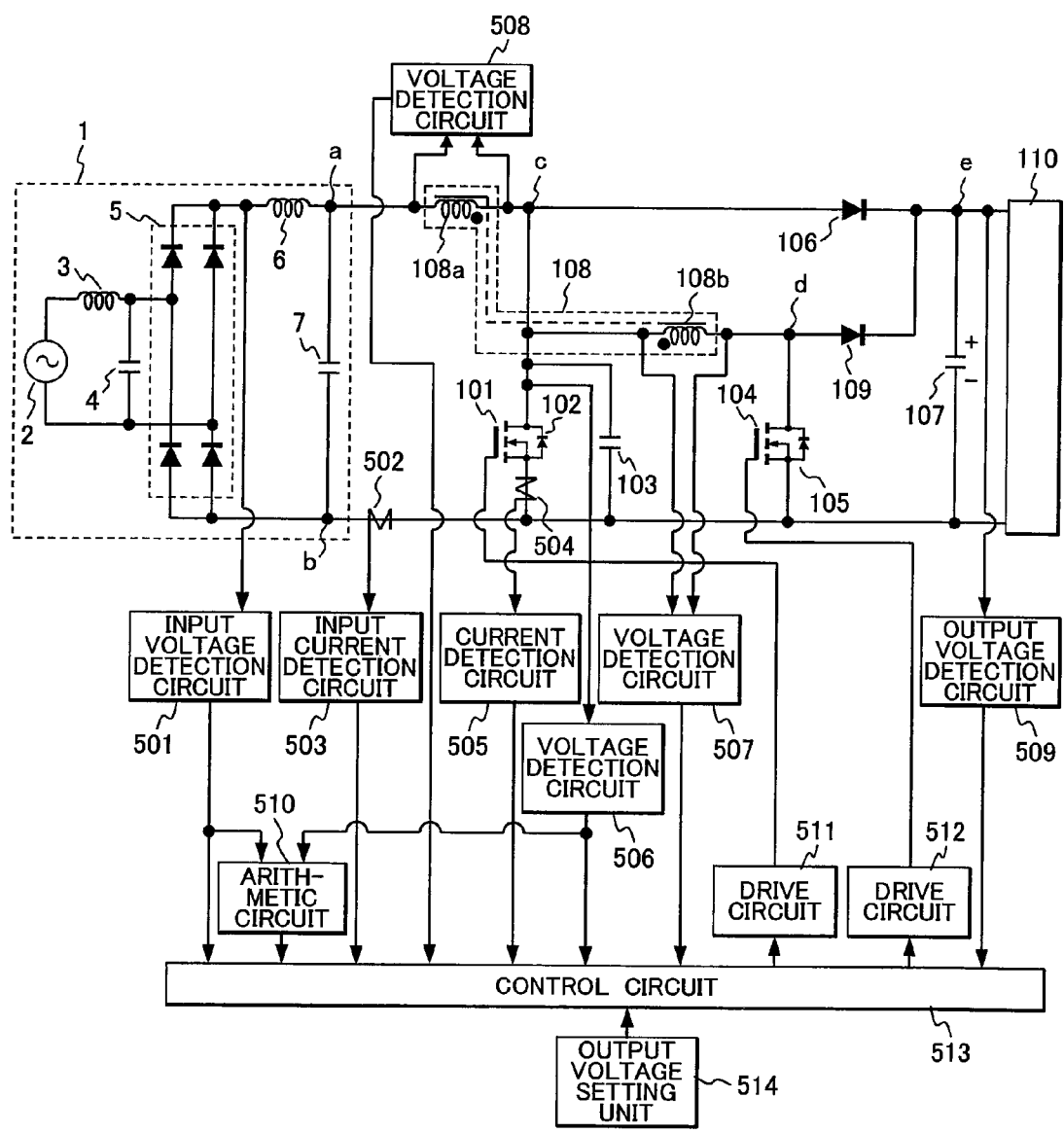
FIG. 5 is a circuitry diagram of a DC-DC converter in a second embodiment of the invention.

FIG. 5 is a circuitry diagram of a DC-DC converter having a detecting means and a control circuit in a second embodiment of the invention. This embodiment is also a boost soft switching DC-DC converter that makes it possible to obtain an output voltage higher than input voltage. In FIG. 5, the same components as in FIG. 1 will be marked with the same reference numerals and the description thereof will be omitted.

Description will be given to a difference of the DC-DC converter in FIG. 5 from that in FIG. 1. In FIG. 5, the direct-current power source 1 in FIG. 1 is comprised of: an alternating-current power source 2; a filter circuit comprised of an inductor 3 and a capacitor 4; a rectifying circuit 5; and a low-pass filter comprised of an inductor 6 and a capacitor 7. That is, the alternating-current voltage of the alternating-current power source 2 is full wave-rectified at the rectifying circuit 5 through the filter circuit comprised of the inductor 3 and the capacitor 4. Then it is converted to a direct-current voltage with a high-frequency component removed through the low-pass filter comprised of the inductor 6 and the capacitor 7.

To detect the voltage or current of each part, an input voltage detection circuit 501 is connected to the output of the rectifying circuit 5; an input current detecting element 502 is connected to the connecting wire of the direct-current power source between point b and the load; the output of the input current detecting element 502 is connected to an input current detection circuit 503; a current detecting element 504 is connected to the source of the main MOSFET 101; the output of the current detecting element is connected to a current detection circuit 505; a voltage detection circuit 506 is connected to the drain of the main MOSFET 101; a voltage detection circuit 507 is connected to both ends of the auxiliary inductor 108*b*; a voltage detection circuit 508 is connected to both ends of the main inductor; an output voltage detection circuit 509 is connected to the positive pole e of the output capacitor 107; and the output of the input voltage detection circuit 501 and the output of the voltage detection circuit 506 are connected to an arithmetic circuit 510. These detection circuits and an output voltage setting unit 514 are connected to a control circuit 513. They are respectively connected from the control circuit 513 to the gate terminals of the main MOSFET 101 and the auxiliary MOSFET 104 through a drive circuit 511 and a drive circuit 512.

Description will be given to the operation of this circuitry. The operation of each part subsequent to the ends a and b of the direct-current power source 1 is the same as that in the first embodiment illustrated in FIG. 1.

The control circuit 513 compares an output voltage set value inputted from the output voltage setting unit 514 with an output voltage value inputted from the output voltage detection circuit 509 and computes the difference between them. Then gate driving signals of the main MOSFET 101 and the auxiliary MOSFET 104 are generated so that the output voltage becomes equal to the output voltage set at the output voltage setting unit 514. These gate driving signals are generated based on the above difference, an input voltage detection value inputted from the input voltage detection circuit 501, and an input current detection value inputted from the input current detection circuit 503. The generated gate driving signals are respectively inputted to the gates of the main MOSFET 101 and the auxiliary MOSFET 104 via the drive circuit 511 and the drive circuit 512. At this time, the gate driving signals are controlled so that the input voltage detection value and the input current detection value have analogous waveforms of the same phase. This makes it possible to improve the power factor in this DC-DC converter. Even though there is not the input voltage detection circuit 501, the power factor can be improved. This is done by providing at least the input current detecting element 502 and the input current detection circuit 503 and estimating the input voltage from their input current detection values.

Description will be given to the control of on time of the main MOSFET 101 and off time of the auxiliary MOSFET 104. To carry out the same control as described in relation to the operation of the first embodiment with respect to the main MOSFET 101 and the auxiliary MOSFET 104, any one of means for implementing the following only has to be taken: detecting the drain-source voltage of the main MOSFET 101; detecting the current of the diode 102 connected in inverse parallel with the main MOSFET 101; and detecting the voltages across the main inductor 108*a* and across the auxiliary inductor 108*b* to indirectly detect the drain-source voltage of the main MOSFET 101.

In the DC-DC converter in FIG. 5, consequently, the following items are provided as the above means: the voltage detection circuit 506 for detecting the drain-source voltage of the main MOSFET 101; the current detecting element 504 and the current detection circuit 505 for detecting the current of the diode 102; the voltage detection circuit 508 for detecting the voltage across the main inductor 108a; the voltage detection circuit 507 for detecting the voltage across the auxiliary inductor 108b; and the arithmetic circuit 510 for computing the outputs of the input voltage detection circuit 501 and the voltage detection circuit 506 to detect the voltage across the main inductor 108a. Using any one of the means cited here, it is detected that the voltage across the main MOSFET 101 has dropped to 0V or a current has passed through the diode 102 and on time of the main MOSFET 101 and off time of the auxiliary MOSFET 104 are thereby controlled.

Third Embodiment

Figure 6:
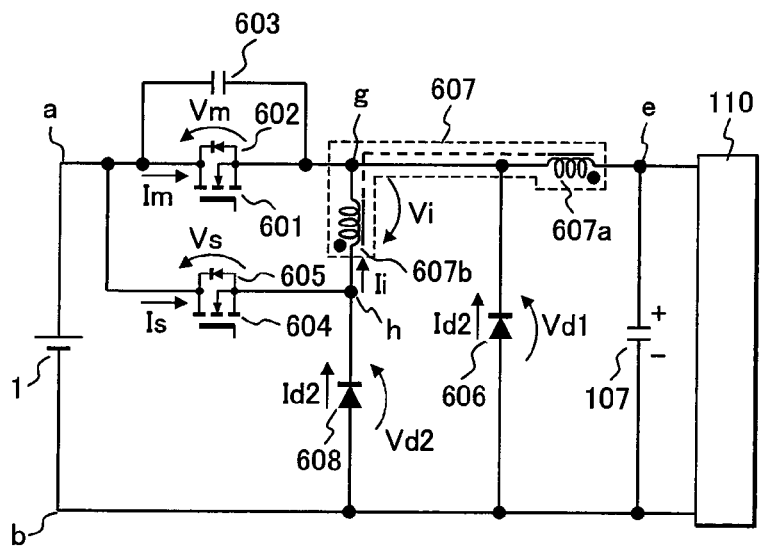
FIG. 6 is a circuitry diagram of a DC-DC converter in a third embodiment of the invention.

FIG. 6 is a circuitry diagram of a DC-DC converter in a third embodiment of the invention. This embodiment is a buck soft switching DC-DC converter that makes it possible to obtain an output voltage lower than input voltage. In FIG. 6, the same components as in FIG. 1 will be marked with the same reference numerals and the description thereof will be omitted.

Description will be given to the circuitry of the DC-DC converter in FIG. 6. The direct-current power source 1 is connected with a series circuit of a main MOSFET 601 and a main diode 606; and the main MOSFET 601 is connected in inverse parallel with a diode 602 and in parallel with a snubber capacitor 603. Between the ends g and b of the main diode, a series circuit of a main inductor 607a and the output capacitor 107 is connected and the ends of the output capacitor 107 are connected to the load 110. Between the ends a and g of the main MOSFET 601, a series circuit of an auxiliary MOSFET 604 and an auxiliary inductor 607b is connected. Between the junction point h between the auxiliary MOSFET 604 and the auxiliary inductor 607b and point b on the negative side of the direct-current power source 1, an auxiliary diode 608 is connected. The auxiliary MOSFET 604 is connected in inverse parallel with a diode 605. Further, the auxiliary inductor 607b is magnetically coupled with the main inductor 607a. The direction of this coupling is the direction in which the auxiliary inductor 607b applies backward voltage to the auxiliary diode 608 when the main inductor 607a discharges energy to the output side.

Description will be given to operation. The voltage and current waveform diagram of each part is the same as in FIG. 3. It is requested that MOSFET 601 should be substituted for the label of MOSFET 101 in FIG. 3 and MOSFET 604 should be substituted for MOSFET 104. Hereafter, description will be given to operation with reference to FIG. 3.

Before time t0, the main MOSFET 601 and the auxiliary MOSFET 604 are off. For this reason, a current does not flow from the direct-current power source 1 and a current flows back to the load side in the loop of the main inductor 607a→the output capacitor 107→the main diode 606. At this time, voltage positive on the point h side is produced in the auxiliary inductor 607b and this voltage reversely biases the auxiliary diode 608 through the main diode 606. When the auxiliary MOSFET 604 is subsequently turned on at time t0, a current starts to flow in the loop of the direct-current power source 1→the auxiliary MOSFET 604→the auxiliary inductor 607b→the main inductor 607a→the output capacitor 107. At this time the auxiliary inductor current Ii is gently increased and the current Id1 of the main diode 606 is gently reduced. Therefore, the auxiliary MOSFET 604 carries out ZCS when it is turned on and the production of loss is reduced.

From time t1, subsequently, the electric charges charged in the drain-source parasitic capacitance of the main MOSFET 601 and the snubber capacitor 603 are discharged through the auxiliary MOSFET 604 and the auxiliary inductor 607b. Then this energy is stored in the auxiliary inductor 607b. At time t2, the voltage Vm of the main MOSFET 601 drops to 0V.

From time t2, subsequently, the auxiliary inductor 607b passes current Is in the loop of the auxiliary inductor 607b→the diode 602→the auxiliary MOSFET 604 by the energy stored during the period from time t0 to time t2. At time t3, subsequently, the driving signal of the main a MOSFET 601 is turned on and the driving signal of the auxiliary MOSFET 604 is turned off. Either of turn-on of the main MOSFET 601 and turn-off of the auxiliary MOSFET 604 may be carried out first as long as they are carried out during the period during which a current is flowing in the diode 602. This period includes time t2 immediately after the voltage Vm of the main MOSFET 601 drops to 0V. This makes it possible for the main MOSFET 601 to carry out ZVS and ZCS and thus switching loss arising from turn-on of the main MOSFET 601 is not produced. When the period from time t2 to time t3 is made shorter, the period during which current is passed through the diode 602 is shortened and the production of loss can be reduced.

When the driving signal of the auxiliary MOSFET 604 is turned off at time t3, the current Im of the main MOSFET 601 conversely starts to increase. The auxiliary inductor 607b passes auxiliary diode current Id2 in the loop of the auxiliary inductor 607b→the main MOSFET 601→the direct-current power source 1→the auxiliary diode 608 by the energy stored in itself. The energy stored in the auxiliary inductor 607b is returned to the input side by the above-mentioned operation and simultaneously the current Id2 is reduced. When the energy is completely discharged, Id2 is zeroed and thereafter, the auxiliary diode 608 enters a reverse recovery period and a recovery current flows. Since the auxiliary inductor 607b exists on the current loop of this recovery current, the recovery current does not become so large as to pose a problem in terms of circuit operation.

At time t4, subsequently, the recovery of the auxiliary diode 608 is completed and the auxiliary diode 608 is rendered non-conductive. Then the current hitherto passed through the auxiliary inductor 607b flows in the loop of the auxiliary inductor 607b→the diode 605→the main MOSFET 601. At this time, in the auxiliary inductor 607b magnetically coupled with the main inductor 607a, voltage positive on the point g side is produced. This voltage is applied to the leakage inductance component of the auxiliary inductor 607b and the current hitherto passed through the auxiliary inductor 607b is reduced and zeroed at time t4'. At the same time a current flows in the loop of the direct-current power source 1→the main MOSFET 601→the main inductor 607a→the output capacitor 107 and this current is increased.

When the gate driving signal of the main MOSFET 601 is subsequently turned off and the current Im of the main MOSFET 601 is interrupted at time t5, the following takes place during the period from time t5 to time t6: the drain-source voltage Vm of the main MOSFET 601 is increased by dv/dt, which is determined by interrupting current, the drain-source parasitic capacitance of the main MOSFET 601, and the capacitance of the snubber capacitor 603. That is, dv/dt of the drain-source voltage of the main MOSFET 601 is made gentle by the drain-source parasitic capacitance of the main MOSFET 601 and the snubber capacitor 603. Then ZVS becomes feasible and turn-off loss is reduced. At time t6, thereafter, the drain-source voltage of the main MOSFET 601 becomes equal to the voltage of the direct-current power source 1. Then the main diode 606 is rendered conductive and voltage positive on the point b side is produced between its ends g and b.

When the drain-source voltage of the main MOSFET 601 rises, the voltage is applied to both ends of a series circuit of the auxiliary MOSFET 604 and the auxiliary inductor 607b. Voltage is applied to the auxiliary inductor 607b until charging of the drain-source parasitic capacitance of the auxiliary MOSFET 604 is completed and a current is passed through the auxiliary inductor 607b. When the voltage Vs across the auxiliary MOSFET 604 becomes equal to the voltage of the direct-current power source 1 at time t7, the auxiliary diode 608 is rendered conductive.

At time t7, subsequently, voltage positive on the point h side is produced in the auxiliary inductor 607b magnetically coupled with the main inductor 607a and this voltage is applied to the leakage inductance component of the auxiliary inductor 607b. The current of the auxiliary inductor 607b is reduced and zeroed at time t7'. The subsequent operation after time t7' is the same as the operation before time t0.

Figure 7:
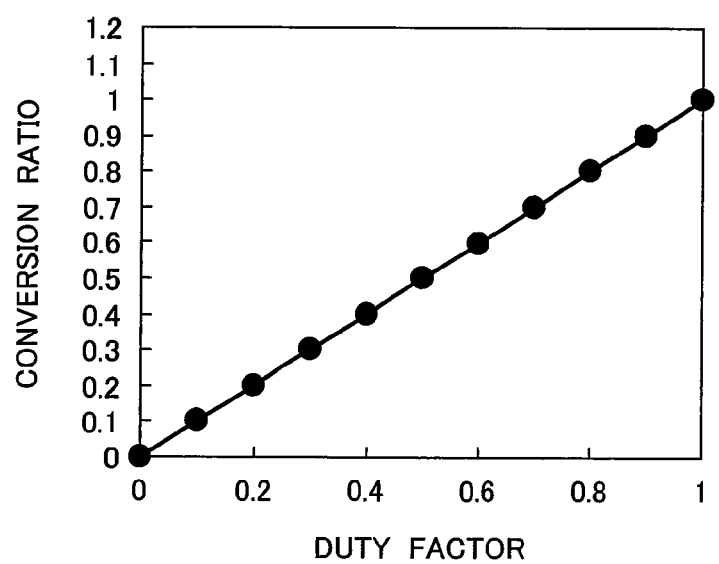
FIG. 7 is an explanatory drawing explaining the operation of the DC-DC converter in FIG. 6.

The relation between the duty factor of the main MOSFET 601 and the boost-buck ratio in this embodiment is as indicated in FIG. 7. According to FIG. 7, the boost-buck ratio in this embodiment is constantly not more than 1.0 and the DC-DC converter in this embodiment has the functions of a buck converter.

Also in this embodiment, ZVS turn-on, ZCS turn-on, and ZVS turn-off can be implemented with respect to the main MOSFET 601 and ZCS turn-on can be implemented with respect to the auxiliary MOSFET 604. This makes it possible to significantly reduce switching loss and thus it is possible to increase frequency and reduce the size and cost of inductors and capacitors.

Fourth Embodiment

Figure 8:
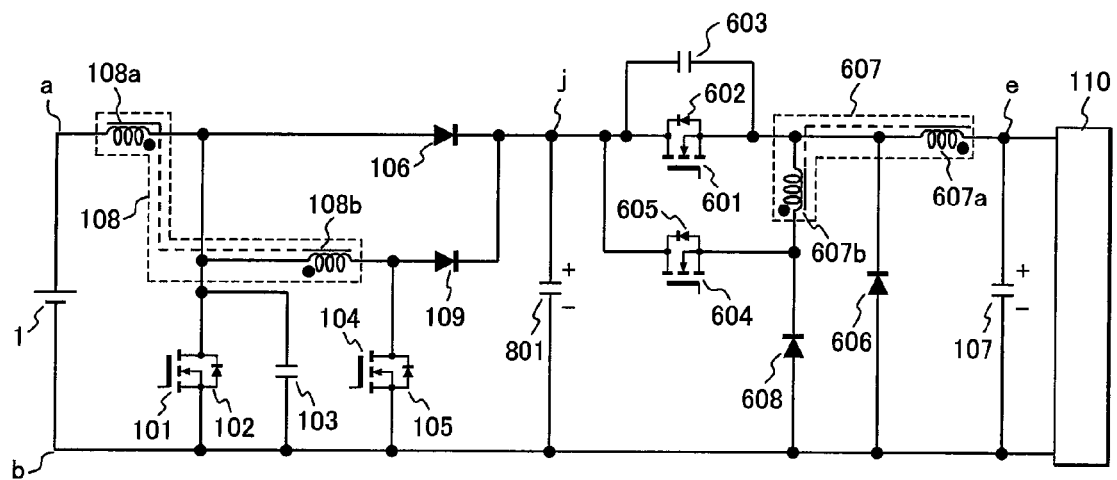
FIG. 8 is a circuitry diagram of a DC-DC converter in a fourth embodiment of the invention.

FIG. 8 is a circuitry diagram of a DC-DC converter in a fourth embodiment of the invention. This embodiment is a boost-buck soft switching DC-DC converter capable of stepping up and down output voltage relative to input voltage. In FIG. 8, the same components as in FIG. 1 and FIG. 6 will be marked with the same reference numerals and the description thereof will be omitted.

Description will be given to the circuitry in FIG. 8. The same circuit as in the first embodiment is connected between points a and b of the direct-current power source 1 and a capacitor 801 is connected between its outputs j and b. The same circuit as in the third embodiment is connected between the ends j and b of the capacitor 801. Description will be given to operation. Voltage produced in the capacitor 801 is stepped up to a voltage higher than input voltage as in the first embodiment. Voltage produced in the output capacitor 107 is stepped down to a voltage lower than the voltage between the ends j and b of the capacitor 801 as in the third embodiment. The relation between the main MOSFET 101 and boost-buck ratio is as indicated in FIG. 4 and the relation between the main MOSFET 601 and boost-buck ratio is as indicated in FIG. 7.

According to this embodiment, as mentioned above, boost-buck operation can be performed by combining a boost circuit and a buck circuit. Further, since boost operation and buck operation can be independently controlled, output voltage can be accurately set. Also in this embodiment, switching loss can be significantly reduced by the introduction of soft switching. This makes it possible to increase frequency and reduce the size and cost of inductors and capacitors.

Fifth Embodiment

Figure 9:
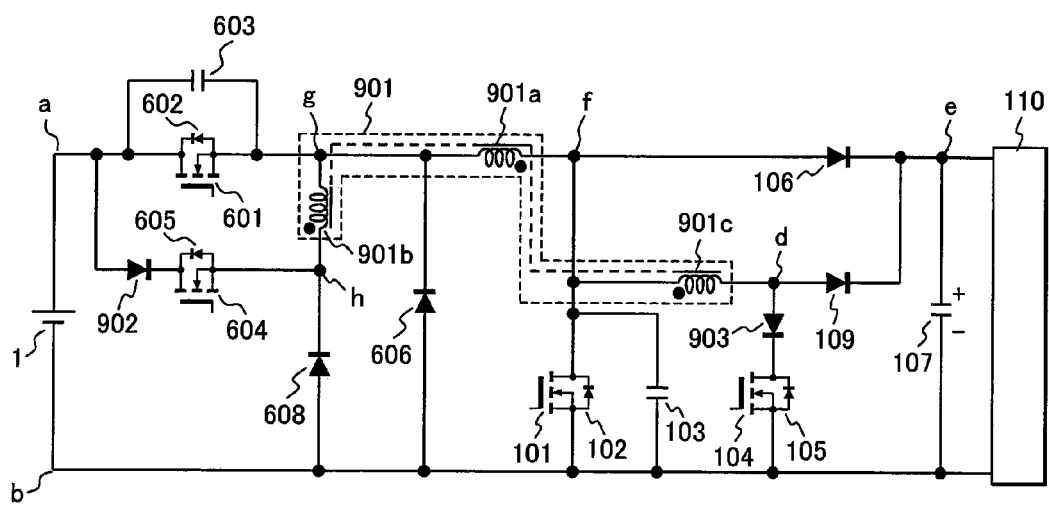
FIG. 9 is a circuitry diagram of a DC-DC converter in a fifth embodiment of the invention.

FIG. 9 is a circuitry diagram of a DC-DC converter in a fifth embodiment of the invention. This embodiment is a boost-buck soft switching DC-DC converter. In FIG. 9, the same components as in FIG. 8 will be marked with the same reference numerals and the description thereof will be omitted.

Description will be given to the circuitry in FIG. 9. The same circuit as in the third embodiment is connected between points a and b of the direct-current power source 1 and the same circuit as in the first embodiment is connected between its outputs f and b. In FIG. 9, a coupled inductor 901 is comprised of a main inductor 901a and auxiliary inductors 901b, 901c and the auxiliary inductor 901b is connected on the point g side and the auxiliary inductor 901c is connected on the point d side. That is, in this embodiment, the main inductor is shared between a boost circuit and a buck circuit.

A reverse-flow prevention diode 902 is placed in series with the buck-side auxiliary MOSFET 604 and a reverse-flow prevention diode 903 is placed in series with the boost-side auxiliary MOSFET 104. The reverse-flow prevention diode 902 is used to prevent the following event in boost operation: voltage is induced in the buck-side auxiliary inductor 901b by voltage applied to the boost-side auxiliary inductor 901c and a current flows in the loop of the auxiliary inductor 901b→the diode 605→the main MOSFET 601. Similarly, the reverse-flow prevention diode 903 is used to prevent the following event in buck operation: voltage is induced in the boost-side auxiliary inductor 901c by voltage applied to the buck-side auxiliary inductor 901b and a current flows in the loop of the auxiliary inductor 901c→the diode 106→the output capacitor 107→the diode 105. If these currents flow, loss is produced in either the boost circuit or the buck circuit, whichever is out of operation and this causes degradation in the efficiency of the converter. However, when the time for which voltage is applied to the auxiliary inductors 901b, 901c is short, the above loss is negligible and the reverse-flow prevention diodes 902, 903 can be omitted.

Description will be given to boost operation first. In boost operation, the buck-side main MOSFET 601 is constantly on and the buck-side auxiliary MOSFET 604 is constantly off. The circuit operation performed between point f and the output side is the same as in the first embodiment and the operating waveform is as indicated in FIG. 3.

Next, description will be given to buck operation. In buck operation, the main MOSFET 101 and the auxiliary MOSFET 104 on the boost circuit side are constantly off. The circuit operation performed between point f and the direct-current power source 1 side is the same as in the third embodiment and the operating waveform is as indicated in FIG. 3. Since the main inductor 901a and the auxiliary inductor 901c are magnetically coupled with each other, the following takes place between point f and the output side: during the period from time t4 to time t5 in FIG. 3, the current flowing from the direct-current power source 1 to the main inductor 901 is shunted to the boost-side main diode 106 and the series circuit of the boost-side auxiliary inductor 901c and the boost-side auxiliary diode 109 and flows into the output capacitor 107. However, this operation does not have any influence on buck operation.

According to this embodiment, as mentioned above, the respective main inductors on the boost circuit side and the buck circuit side can be shared and integrated. This makes it possible to reduce the size of the coupled inductor and the size and cost of the system.

Sixth Embodiment

Figure 10:
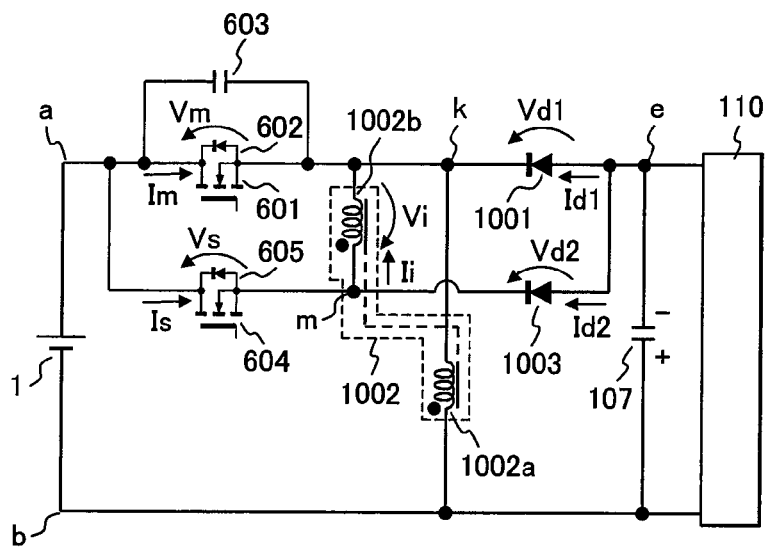
FIG. 10 is a circuitry diagram of a DC-DC converter in a sixth embodiment of the invention.

FIG. 10 is a circuitry diagram of a DC-DC converter in a sixth embodiment of the invention. This embodiment is an output inverting boost-buck soft switching DC-DC converter. In FIG. 10, the same components as in FIG. 6 will be marked with the same reference numerals and the description thereof will be omitted.

Description will be given to the circuitry in FIG. 10. The direct-current power source 1 is connected with a series circuit of the main MOSFET 601 and a main inductor 1002*a*. This main MOSFET 601 is connected in inverse parallel with the diode 602 and in parallel with the snubber capacitor 603. To take out output voltage, a series circuit of a main diode 1001 and the output capacitor 107 is connected between the ends k and b of the main inductor 1002*a*. The ends of the output capacitor 107 are the output terminals of the DC-DC converter and are connected with the load 110.

A series circuit of the auxiliary MOSFET 604 and an auxiliary inductor 1002*b* is connected between the ends a and k of the main MOSFET 601. An auxiliary diode 1003 is connected between the junction point m between the auxiliary MOSFET 604 and the auxiliary inductor 1002*b* and point e on the output side. The auxiliary MOSFET 604 is connected in inverse parallel with the diode 605. Further, the auxiliary inductor 1002*b* is magnetically coupled with the main inductor 1002*a* and the direction of this coupling is the direction in which the auxiliary inductor 1002*b* applies backward voltage to the auxiliary diode 1003 when the main inductor 1002*a* discharges energy to the output side.

Description will be given to operation. The voltage and current waveform diagram of each part is the same as in FIG. 3. It is requested that MOSFET 601 should be substituted for the label of MOSFET 101 in FIG. 3 and MOSFET 604 should be substituted for MOSFET 104. Hereafter, description will be given to operation with reference to FIG. 3.

Before time t0, the main MOSFET 601 and the auxiliary MOSFET 604 are off. For this reason, a current does not flow from the direct-current power source 1 and a current flows back to the load side in the loop of the main inductor 1002*a*→the output capacitor 107→the main diode 1001. That is, negative voltage is outputted at point e relative to point b on the output side. At this time, voltage positive on the point m side is produced in the auxiliary inductor 1002*b*. This voltage reversely biases the auxiliary diode 1003 through the main diode 1001.

When the auxiliary MOSFET 604 is subsequently turned on at time t0, a current starts to flow in the loop of the direct-current power source 1→the auxiliary MOSFET 604→the auxiliary inductor 1002*b*→the main inductor 1002*a*. At this time, the auxiliary inductor current Ii is gently increased and the current Id1 of the main diode 1001 is gently reduced. Therefore, the auxiliary MOSFET 604 carries out ZCS when it is turned on and the production of loss is reduced.

From time t1, the electric charges charged in the drain-source parasitic capacitance of the main MOSFET 601 and the snubber capacitor 603 are discharged through the auxiliary MOSFET 604 and the auxiliary inductor 1002*b*. Then this energy is stored in the auxiliary inductor 1002*b*. At time t2, the voltage Vm of the main MOSFET 601 drops to 0V.

From time t2, subsequently, the auxiliary inductor 1002*b* passes current Is in the loop of the auxiliary inductor 1002*b*→the diode 602→the auxiliary MOSFET 604 by the energy stored during the period from time t0 to time t2. At time t3, subsequently, the driving signal of the main MOSFET 601 is turned on and the driving signal of the auxiliary MOSFET 604 is turned off. Either of turn-on of the main MOSFET 601 and turn-off of the auxiliary MOSFET 604 may be carried out first as long as they are carried out during the period during which a current is flowing in the diode 602. This period includes time t2 immediately after the voltage Vm of the main MOSFET 601 drops to 0V. This makes it possible for the main MOSFET 601 to carry out ZVS and ZCS and thus switching loss arising from turn-on of the main MOSFET 601 is not produced. When the period from time t2 to time t3 is made shorter, the period during which current is passed through the diode 602 is shortened and the production of loss can be reduced.

When the driving signal of the auxiliary MOSFET 604 is turned off at time t3, the current Im of the main MOSFET 601 conversely starts to increase. The auxiliary inductor 1002*b* passes the current Id2 of the auxiliary diode 1003 in the loop of the auxiliary inductor 1002*b*→the main MOSFET 601→the direct-current power source 1→the output capacitor 107→the auxiliary diode 1003 by the energy stored in itself. The energy stored in the auxiliary inductor 1002*b* is returned to the input side and the output side by the above-mentioned operation and simultaneously the current Id2 is reduced. When the energy is completely discharged, Id2 is zeroed and thereafter, the auxiliary diode 1003 enters a reverse recovery period and a recovery current flows. Since the auxiliary inductor 1002*b* exists on the current loop of this recovery current, the recovery current does not become so large as to pose a problem in terms of circuit operation.

At time t4, subsequently, the recovery of the auxiliary diode 1003 is completed and the auxiliary diode 1003 is rendered non-conductive. Then the current hitherto passed through the auxiliary inductor 1002*b* flows in the loop of the auxiliary inductor 1002*b*→the diode 605→the main MOSFET 601. At this time, in the auxiliary inductor 1002*b* magnetically coupled with the main inductor 1002*a*, voltage positive on the point k side is produced and this voltage is applied to the leakage inductance component of the auxiliary inductor 1002*b*. The current passed through the auxiliary inductor 1002*b* is reduced and zeroed at time t4'. At the same time a current flows in the loop of the direct-current power source 1→the main MOSFET 601→the main inductor 1002*a* and this current is increased.

When the gate driving signal of the main MOSFET 601 is subsequently turned off and the current Im of the main MOSFET 601 is interrupted at time t5, the following takes place during the period from time t5 to time t6: the drain-source voltage Vm of the main MOSFET 601 is increased by dv/dt, which is determined by interrupting current, the drain-source parasitic capacitance of the main MOSFET 601, and the capacitance of the snubber capacitor 603. That is, dv/dt of the drain-source voltage of the main MOSFET 601 is made gentle by the drain-source parasitic capacitance of the main MOSFET 601 and the snubber capacitor 603. Then ZVS becomes feasible and turn-off loss is reduced. At time t6, thereafter, the drain-source voltage of the main MOSFET 601 becomes equal to the sum of the direct-current voltage 1 and the voltage of the output capacitor 107. Then the main diode 1001 is rendered conductive and voltage positive on the point e side is produced between its ends e and k.

When the drain-source voltage of the main MOSFET 601 rises, the voltage is applied to both ends of a series circuit of the auxiliary MOSFET 604 and the auxiliary inductor 1002*b*. Voltage is applied to the auxiliary inductor 1002*b* until charging of the drain-source parasitic capacitance of the auxiliary MOSFET 604 is completed and a current is passed through the auxiliary inductor 1002b. When the voltage Vs across the auxiliary MOSFET 604 becomes equal to the sum of the voltages of the direct-current power source 1 and the output capacitor 107 at time t7, the auxiliary diode 1003 is rendered conductive.

At time t7, subsequently, voltage positive on the point m side is produced in the auxiliary inductor 1002b magnetically coupled with the main inductor 1002a and this voltage is applied to the leakage inductance component of the auxiliary inductor 1002b. The current of the auxiliary inductor 1002b is reduced and zeroed at time t7'. The subsequent operation after time t7' is the same as the operation before time t0.

Figure 11:
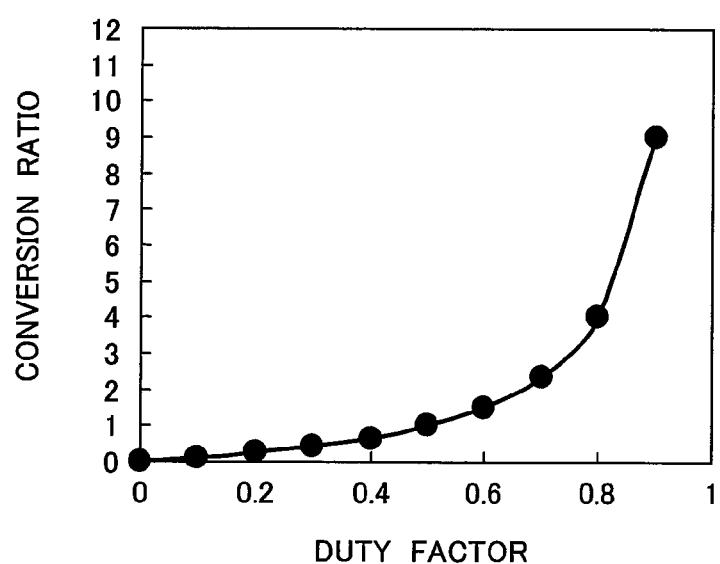
FIG. 11 is an explanatory drawing explaining the operation of the DC-DC converter in FIG. 10.

The relation between the duty factor of the main MOSFET 601 and the boost-buck ratio in this embodiment is as illustrated in FIG. 11. According to FIG. 11, the DC-DC converter in this embodiment has the functions of a boost-buck converter. It performs buck operation when the duty factor of the main MOSFET 601 is not more than 0.5 and performs boost operation when the duty factor is not less than 0.5. The DC-DC converter outputs negative voltage opposite input voltage.

Also in this embodiment, ZVS turn-on, ZCS turn-on, and ZVS turn-off can be implemented with respect to the main MOSFET 601 and ZCS turn-on can be implemented with respect to the auxiliary MOSFET 604. This makes it possible to significantly reduce switching loss and thus it is possible to increase frequency and reduce the size and cost of the inductors and capacitors.

Seventh Embodiment

Figure 12:
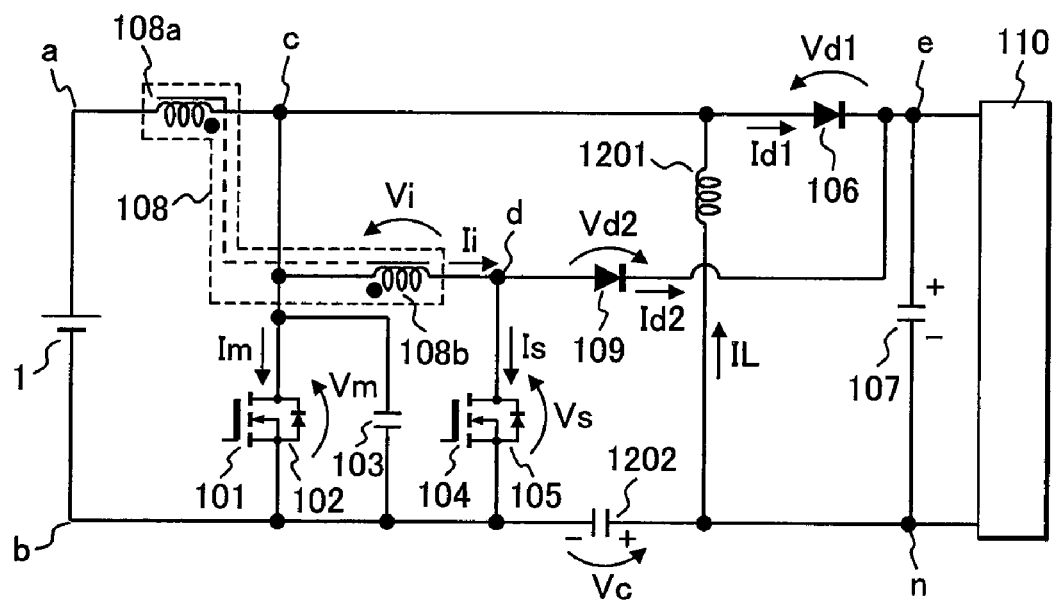
FIG. 12 is a circuitry diagram of a DC-DC converter in a seventh embodiment of the invention.

FIG. 12 is a circuitry diagram of a DC-DC converter in a seventh embodiment of the invention. This embodiment is a boost-buck soft switching DC-DC converter. In FIG. 12, the same components as in FIG. 1 will be marked with the same reference numerals and the description thereof will be omitted.

Description will be given to the circuitry in FIG. 12. A difference from the DC-DC converter in FIG. 1 is that: a smoothing capacitor 1202 is placed between point b on the negative pole side of the direct-current power source 1 and point n on the negative pole side on the load side; and a smoothing inductor 1201 is connected between the junction point c between the main inductor 108a and the main diode 106 and point n on the negative pole side of the load. When the smoothing capacitor 1202 discharges energy stored in the auxiliary inductor 108b, it is positioned on the energy discharge path. This will be described later.

Figure 13:
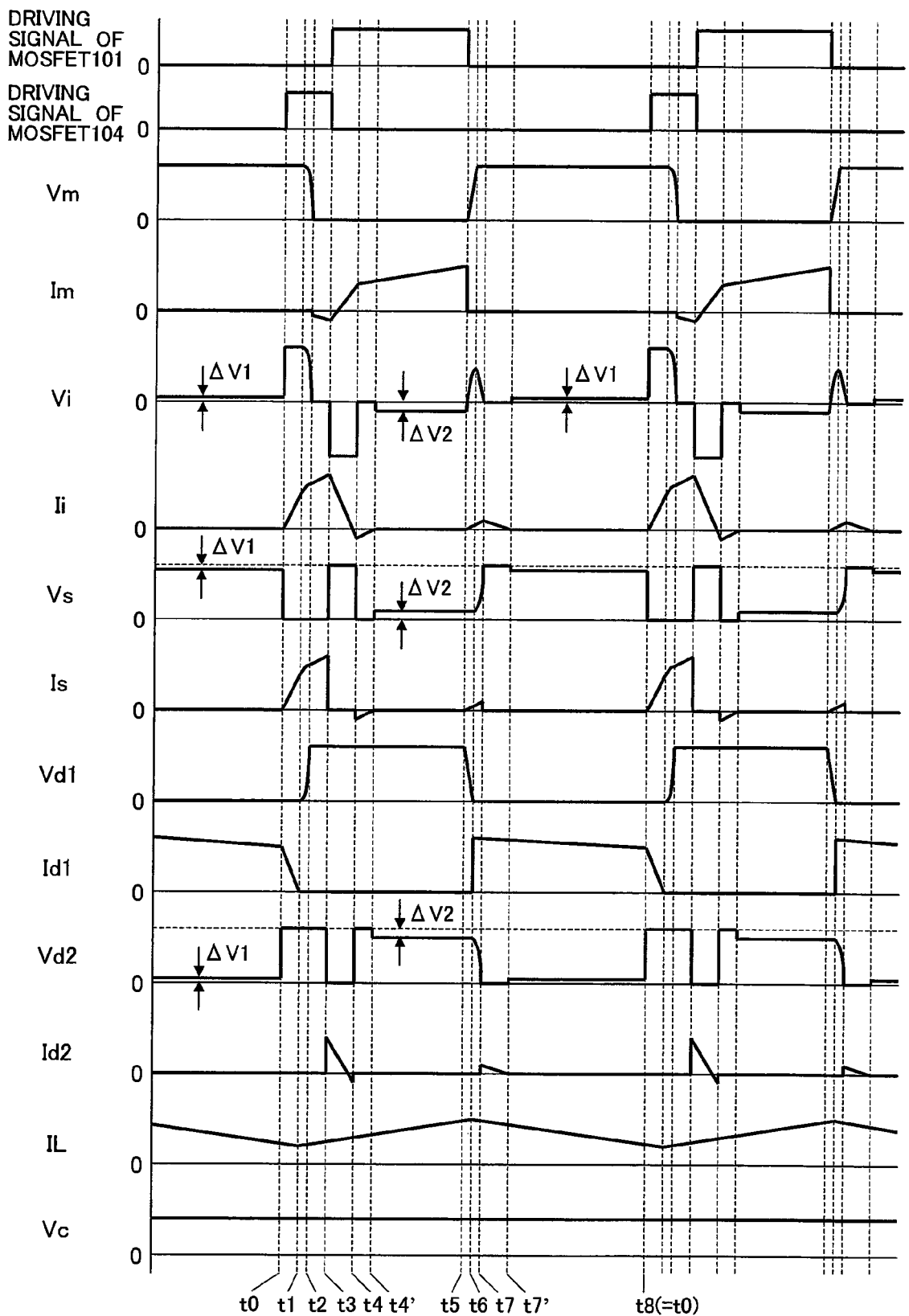
FIG. 13 is a voltage and current waveform diagram explaining the operation of the DC-DC converter in FIG. 12.

Description will be given to operation. The voltage and current waveform diagram of each part is as indicated in FIG. 13. Hereafter, description will be given with reference to FIG. 13.

Before time t0, the main MOSFET 101 and the auxiliary MOSFET 104 are off. At this time a current flows in the loop of the direct-current power source 1→the main inductor 108a→the main diode 106→the output capacitor 107→the smoothing capacitor 1202. In the smoothing capacitor 1202, voltage Vc positive on the point n side is produced. This voltage Vc becomes equal to the voltage of the direct-current power source 1. At the same time a current flows in the loop of the smoothing inductor 1201→the main diode 106→the output capacitor 107. In the auxiliary inductor 108b, voltage positive on the point c side is produced and this voltage reversely biases the auxiliary diode 109 through the main diode 106.

When the auxiliary MOSFET 104 is subsequently turned on at time t0, a current starts to flow in the loop of the direct-current power source 1→the main inductor 108a→the auxiliary inductor 108b→the auxiliary MOSFET 104. At this time, the auxiliary inductor current Ii is gently increased and the current Id1 of the main diode 106 is gently reduced. Therefore, the auxiliary MOSFET 104 carries out ZCS when it is turned on and the production of loss is reduced.

From time t1, the electric charges charged in the drain-source parasitic capacitance of the main MOSFET 101 and the snubber capacitor 103 are discharged through the auxiliary inductor 108b and the auxiliary MOSFET 104. Then this energy is stored in the auxiliary inductor 108b. At time t2, the voltage Vm of the main MOSFET 101 drops to 0V. Simultaneously, voltage is applied from the smoothing capacitor 1202 to the smoothing inductor 1201 and this current IL conversely starts to increase.

From time t2, subsequently, the auxiliary inductor 108b passes current Is in the loop of the auxiliary inductor 108b→the auxiliary MOSFET 104→the diode 102 by the energy stored during the period from time t0 to time t2. At time t3, subsequently, the driving signal of the main MOSFET 101 is turned on and the driving signal of the auxiliary MOSFET 104 is turned off. Either of turn-on of the main MOSFET 101 and turn-off of the auxiliary MOSFET 104 may be carried out first as long as they are carried out during the period during which a current is flowing in the diode 102. This period includes time t2 immediately after the voltage Vm of the main MOSFET 101 drops to 0V. This makes it possible for the main MOSFET 101 to carry out ZVS and ZCS and thus switching loss arising from turn-on of the main MOSFET 101 is not produced. When the period from time t2 to time t3 is made shorter, the period during which current is passed through the diode 102 is shortened and the production of loss can be reduced.

When the driving signal of the auxiliary MOSFET 104 is turned off at time t3, the current Im of the main MOSFET 101 conversely starts to increase. The auxiliary inductor 108b passes the auxiliary diode current Id2 in the loop of the auxiliary inductor 108b→the auxiliary diode 109→the output capacitor 107→the smoothing capacitor 1202→the main MOSFET 101 by the energy stored in itself. The energy stored in the auxiliary inductor 108b is discharged to the output capacitor 107 and the smoothing capacitor 1202 by the above-mentioned operation and simultaneously the current Id2 is reduced. When the energy is completely discharged, Id2 is zeroed and thereafter, the auxiliary diode 109 enters a reverse recovery period and a recovery current flows. Since the auxiliary inductor 108b exists on the current loop of this recovery current, the recovery current does not become so large as to pose a problem in terms of circuit operation.

At time t4, subsequently, the recovery of the auxiliary diode 109 is completed and the auxiliary diode 109 is rendered non-conductive. Then the current hitherto passed though the auxiliary inductor 108b flows in the loop of the auxiliary inductor 108b→the main MOSFET 101→the diode 105. At this time, in the auxiliary inductor 108b magnetically coupled with the main inductor 108a, voltage positive on the point d side is produced and this voltage is applied to the leakage inductance component of the auxiliary inductor 108b. The current passed through the auxiliary inductor 108b is reduced and zeroed at time t4'. At the same time, a current flows in the loop of the direct-current power source 1→the main inductor 108a→the main MOSFET 101 and this current is increased.

When the gate driving signal of the main MOSFET 101 is subsequently turned off and the current Im of the main MOS- FET 101 is interrupted at time t5, the following takes place during the period from time t5 to time t6: the voltage Vm of the main MOSFET 101 is increased by dv/dt, which is determined by interrupting current, the drain-source parasitic capacitance of the main MOSFET 101, and the capacitance of the snubber capacitor 103. That is, dv/dt of the voltage Vm of the main MOSFET 101 is made gentle by the drain-source parasitic capacitance of the main MOSFET 101 and the snubber capacitor 103. Then ZVS becomes feasible and turn-off loss is reduced.

At time t6, thereafter, the voltage Vm of the main MOSFET 101 becomes equal to the sum of the voltage of the output capacitor 107 and the voltage Vc of the smoothing capacitor 1202. Then the main diode 106 is rendered conductive.

When the drain-source voltage of the main MOSFET 101 rises, the voltage is applied to both ends of a series circuit of the auxiliary inductor 108b and the auxiliary MOSFET 104. Voltage is applied to the auxiliary inductor 108b until charging of the drain-source parasitic capacitance of the auxiliary MOSFET 104 is completed and a current is passed through the auxiliary inductor 108b. When the voltage Vs across the auxiliary MOSFET 104 becomes equal to the sum of the voltage of the output capacitor 107 and the voltage Vc of the smoothing capacitor 1202 at time t7, the auxiliary diode 109 is rendered conductive.

At time t7, subsequently, voltage positive on the point c side is produced in the auxiliary inductor 108b magnetically coupled with the main inductor 108a and this voltage is applied to the leakage inductance component of the auxiliary inductor 108b. The current of the auxiliary inductor 108b is reduced and zeroed at time t7'. The subsequent operation after time t7' is the same as the operation before time t0.

The relation between the duty factor of the main MOSFET 101 and the boost-buck ratio in this embodiment is as indicated in FIG. 11. According to FIG. 11, the DC-DC converter in this embodiment has the functions of a boost-buck converter. It performs buck operation when the duty factor of the main MOSFET 101 is not more than 0.5 and performs boost operation when the duty factor is not less than 0.5. Also in this embodiment, ZVS turn-on, ZCS turn-on, and ZVS turn-off can be implemented with respect to the main MOSFET 101 and ZCS turn-on can be implemented with respect to the auxiliary MOSFET 104. This makes it possible to significantly reduce switching loss and thus it is possible to increase frequency and reduce the size and cost of the inductors and capacitors.

Eighth Embodiment

Figure 14:
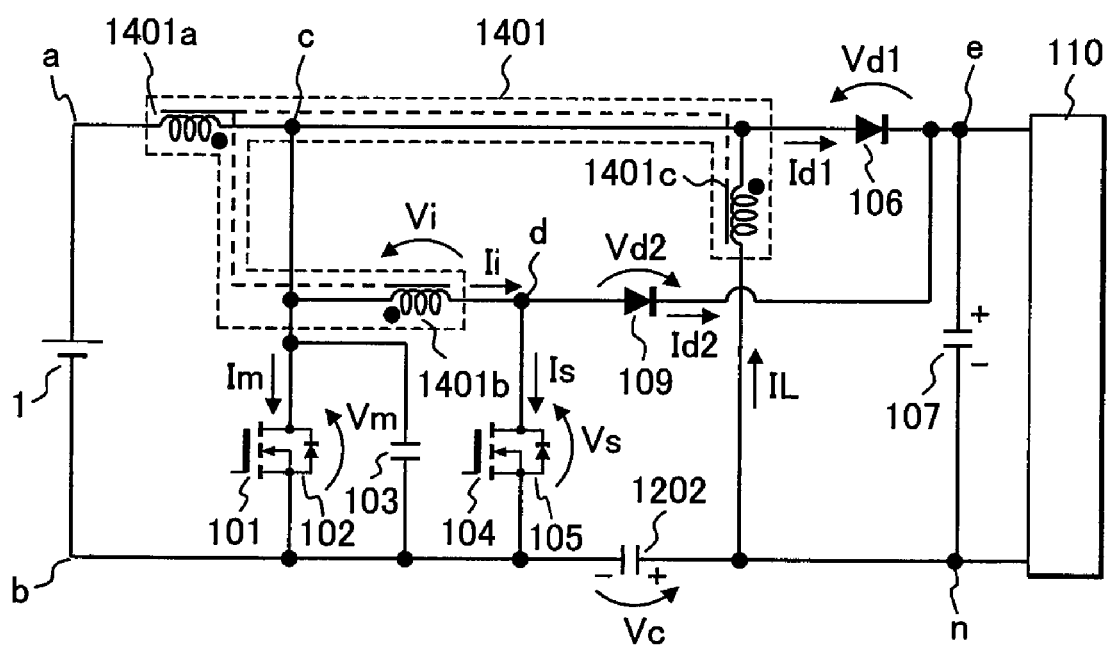
FIG. 14 is a circuitry diagram of a DC-DC converter in an eighth embodiment of the invention.

FIG. 14 is a circuitry diagram of a DC-DC converter in an eighth embodiment of the invention. This embodiment is a boost-buck soft switching DC-DC converter. In FIG. 14, the same components as in FIG. 12 will be marked with the same reference numerals and the description thereof will be omitted.

Description will be given to the circuitry in FIG. 14. A difference from the DC-DC converter in FIG. 12 is that: the inductor 108 (a coupled inductor of the main inductor 108a and the auxiliary inductor 108b) and the smoothing inductor 1201 in FIG. 12 are magnetically coupled with each other to obtain an inductor 1401.

Figure 15:
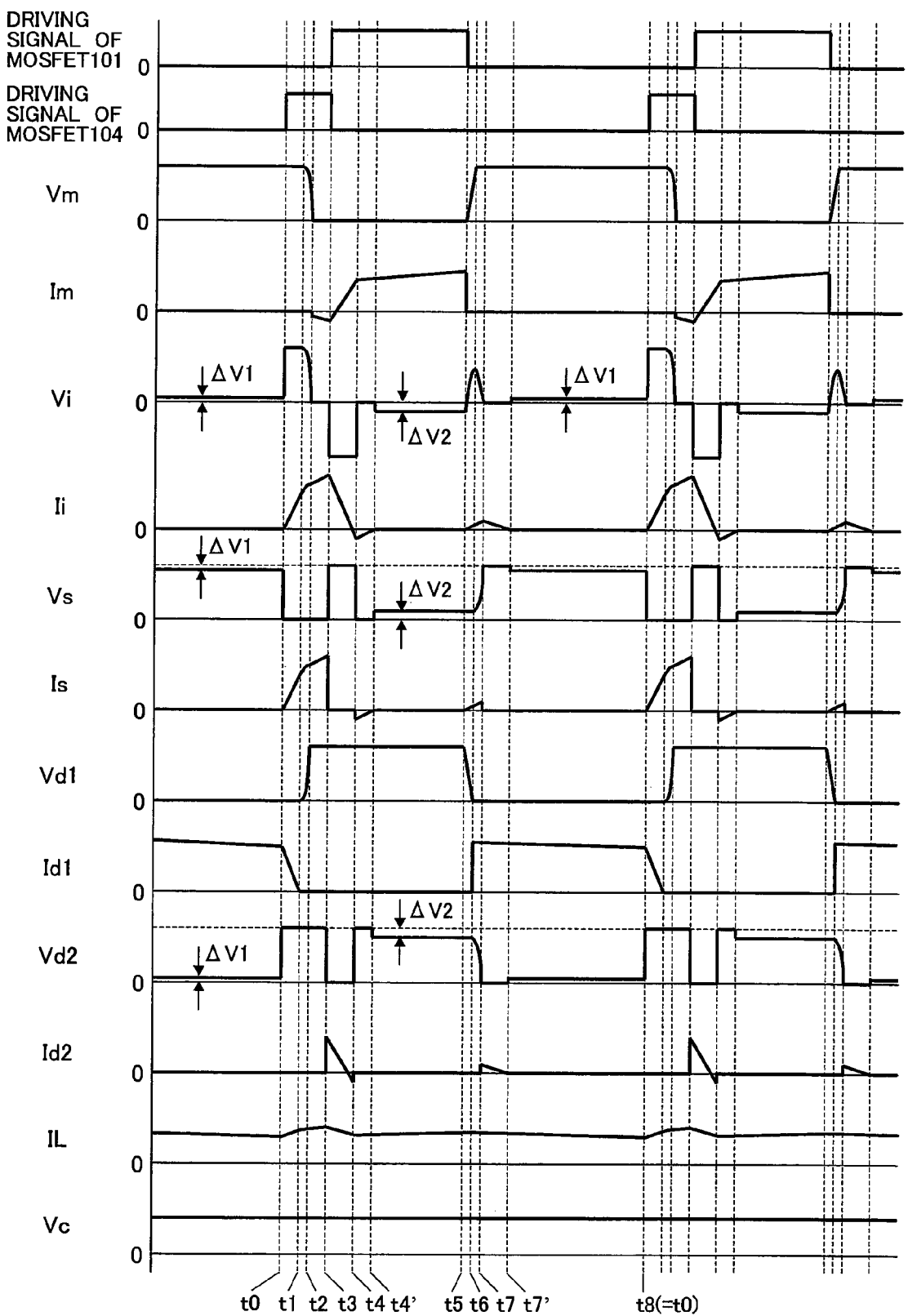
FIG. 15 is a voltage and current waveform diagram explaining the operation of the DC-DC converter in FIG. 14.

Description will be given to operation. The voltage and current waveform diagram of each part is as indicated in FIG. 15. Hereafter, description will be given with reference to FIG. 15.

The operation is the same as that in the seventh embodiment. Since a main inductor 1401a and a smoothing inductor 1401c are coupled with each other, a ripple current passed through the above inductor is reduced. In conjunction therewith, the peak current values of the current Im of the main MOSFET 101 and the current Id1 of the main diode 106 are reduced. For this reason, the loss in each element is reduced.

Description will be given to the reason why the main inductor 1401a and the smoothing inductor 1401c can be coupled with each other and the effect of the coupling. When the main MOSFET 101 is on, a current is passed through the main inductor 1401a in the loop of the direct-current power source 1→the main inductor 1401a→the main MOSFET 101; and a current is passed through the smoothing inductor 1401c in the loop of the smoothing capacitor 1202→the smoothing inductor 1401c→the main MOSFET 101. Since the voltage of the smoothing capacitor 1202 is equal to the voltage of the direct-current power source 1, it can be considered that the voltage of the direct-current power source 1 is similarly applied to the main inductor 1401a and to the smoothing inductor 1401c.

When the main MOSFET 101 is off, a current is passed through the main inductor 1401a in the loop of the direct-current power source 1→the main inductor 1401a→the main diode 106→the output capacitor 107→the smoothing capacitor 1202; and a current is passed through the smoothing inductor 1401c in the loop of the smoothing inductor 1401c→the main diode 106→the output capacitor 107. Since the voltage of the smoothing capacitor 1202 is equal to the voltage of the direct-current power source 1, it can be considered that the voltage of the output capacitor 107 is similarly applied to the main inductor 1401a and the smoothing inductor 1401c. The on-voltages of the main MOSFET 101 and the main diode 106 are slight as compared with the voltage of the direct-current power source 1 and the like and thus they are disregarded.

As mentioned above, equal voltages are respectively applied to the main inductor 1401a and the smoothing inductor 1401c. When they are magnetically coupled with each other with the directions of voltage application made homopolar, therefore, this is equivalent to that their inductance values are increased by the action of mutual inductance. This reduces the ripple currents of the main inductor 1401a and the smoothing inductor 1401c. As the result of the reduction of ripple currents, change of magnetic flux in the core is also reduced and core loss can also be reduced. Meanwhile, ones of the respective windings of the main inductor 1401a, auxiliary inductor 1401b, and smoothing inductor 1401c are at the same potential. Because of this, it is unnecessary to provide an insulation distance at the terminals at the same potential of the respective windings when these inductors are formed on one and the same core; therefore, the inductors can be formed in small size.

The relation between the duty factor of the main MOSFET 101 and the boost-buck ratio in this embodiment is as indicated in FIG. 11 like that in the seventh embodiment.

In this embodiment, the inductors can be further reduced in size as compared with the seventh embodiment. Since the loss in the inductors as well as the loss in the switching elements can be reduced, the further enhancement of efficiency and the further cost reduction can be achieved.

Ninth Embodiment

Figure 16:
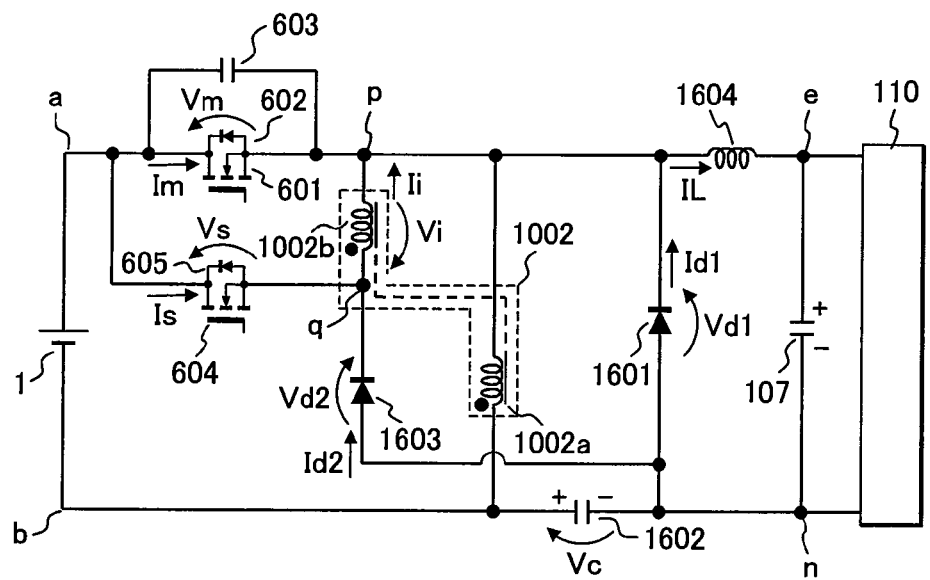
FIG. 16 is a circuitry diagram of a DC-DC converter in a ninth embodiment of the invention.

FIG. 16 is a circuitry diagram of a DC-DC converter in a ninth embodiment of the invention. This embodiment is a boost-buck soft switching DC-DC converter. In FIG. 16, the same components as in FIG. 10 will be marked with the same reference numerals and the description thereof will be omitted.

Description will be given to the circuitry in FIG. 16. The direct-current power source 1 is connected with a series circuit of the main MOSFET 601 and the main inductor 1002a. This main MOSFET 601 is connected in inverse parallel with the diode 602 and in parallel with the snubber capacitor 603 and is further connected in parallel with a series circuit of the auxiliary MOSFET 604 and the auxiliary inductor 1002b. The auxiliary MOSFET 604 is connected in inverse parallel with the diode 605.

To take out output voltage, a series circuit of a smoothing inductor 1604, the output capacitor 107, and a smoothing capacitor 1602 is connected between the ends p and b of the main inductor 1002a; and a main diode 1601 is connected in inverse parallel with the series circuit portion of the smoothing inductor 1604 and the output capacitor 107. The ends of the output capacitor 107 are the output terminals of the DC-DC converter and are connected with the load 110. In addition, an auxiliary diode 1603 is connected between point n on the negative pole side of the output capacitor 107 and the junction point q between the auxiliary MOSFET 604 and the auxiliary inductor 1002b. The auxiliary inductor 1002b is magnetically coupled with the main inductor 1002a and the direction of this coupling is the same as illustrated in FIG. 10.

Description will be given to operation. The voltage and current waveform diagram of each part is the same as in FIG. 13. It is requested that MOSFET 601 should be substituted for the label of MOSFET 101 in FIG. 13 and MOSFET 604 should be substituted for MOSFET 104. Hereafter, description will be given to operation with reference to FIG. 13.

Before time t0, the main MOSFET 601 and the auxiliary MOSFET 604 are off. For this reason, a current does not flow from the direct-current power source 1 and a current flows back to the load side in the loop of the smoothing inductor 1604→the output capacitor 107→the main diode 1601. At the same time, a current flows in the loop of the main inductor 1002a→the smoothing capacitor 1602→the main diode 1601. At this time voltage Vc positive on the point b side is produced in the smoothing capacitor 1602. This voltage Vc is equal to the voltage of the output capacitor 107 as output voltage. In the auxiliary inductor 1002b, voltage positive on the point q side is produced and this voltage reversely biases the auxiliary diode 1603 through the main diode 1601.

When the auxiliary MOSFET 604 is subsequently turned on at time t0, a current starts to flow in the loop of the direct-current power source 1→the auxiliary MOSFET 604→the auxiliary inductor 1002b→the smoothing inductor 1604. At this time, the auxiliary inductor current Ii is gently increased and the current Id1 of the main diode 1601 is gently reduced. Therefore, the auxiliary MOSFET 604 carries out ZCS when it is turned on and the production of loss is reduced.

From time t1, the electric charges charged in the drain-source parasitic capacitance of the main MOSFET 601 and the snubber capacitor 603 are discharged through the auxiliary MOSFET 604 and the auxiliary inductor 1002b. Then this energy is stored in the auxiliary inductor 1002b. At time t2, the voltage Vm of the main MOSFET 601 drops to 0V. At the same time, the sum of the voltage of the direct-current power source 1 and the voltage of the smoothing capacitor 1602 is applied to the series circuit of the smoothing inductor 1604 and the output capacitor 107. Since the voltage of the smoothing capacitor 1602 is equal to the voltage of the output capacitor 107 as output voltage, the voltage of the direct-current power source 1 is applied to the smoothing inductor 1604 and its current IL conversely starts to increase.

From time t2, subsequently, the auxiliary inductor 1002b passes current Is in the loop of the auxiliary inductor 1002b→the diode 602→the auxiliary MOSFET 604 by the energy stored during the period from time t0 to time t2. At time t3, subsequently, the driving signal of the main MOSFET 601 is turned on and the driving signal of the auxiliary MOSFET 604 is turned off. Either of turn-on of the main MOSFET 601 and turn-off of the auxiliary MOSFET 604 may be carried out first as long as they are carried out during the period during which a current is flowing in the diode 602. This period includes time t2 immediately after the voltage Vm of the main MOSFET 601 drops to 0V. This makes it possible for the main MOSFET 601 to carry out ZVS and ZCS and thus switching loss arising from turn-on of the main MOSFET 601 is not produced. When the period from time t2 to time t3 is made shorter, the period during which current is passed through the diode 602 is shortened and the production of loss can be reduced.

When the driving signal of the auxiliary MOSFET 604 is turned off at time t3, the current Im of the main MOSFET 601 conversely starts to increase. The auxiliary inductor 1002b passes the auxiliary diode current Id2 in the loop of the auxiliary inductor 1002b→the direct-current power source 1→the smoothing capacitor 1602→the auxiliary diode 1603 by the energy stored in itself. The energy stored in the auxiliary inductor 1002b is discharged to the direct-current power source 1 and the smoothing capacitor 1602 by the above-mentioned operation and simultaneously the current Id2 is reduced. When the energy is completely discharged, Id2 is zeroed and thereafter, the auxiliary diode 1603 enters a reverse recovery period and a recovery current flows. Since the auxiliary inductor 1002b exists on the current loop of this recovery current, the recovery current does not become so large as to pose a problem in terms of circuit operation.

At time t4, subsequently, the recovery of the auxiliary diode 1603 is completed and the auxiliary diode 1603 is rendered non-conductive. Then the current hitherto passed through the auxiliary inductor 1002b flows in the loop of the auxiliary inductor 1002b→the diode 605→the main MOSFET 601. At this time, in the auxiliary inductor 1002b magnetically coupled with the main inductor 1002a, voltage positive on the point p side is produced and this voltage is applied to the leakage inductance component of the auxiliary inductor 1002b. The current passed through the auxiliary inductor 1002b is reduced and zeroed at time t4'. At the same time a current flows in the loop of the direct-current power source 1→the main MOSFET 601→the main inductor 1002a and this current is increased.

When the gate driving signal of the main MOSFET 601 is subsequently turned off and the current Im of the main MOSFET 601 is interrupted at time t5, the following takes place during the period from time t5 to time t6: the voltage Vm of the main MOSFET 601 is increased by dv/dt, which is determined by interrupting current, the drain-source parasitic capacitance of the main MOSFET 601, and the capacitance of the snubber capacitor 603. That is, dv/dt of the voltage Vm of the main MOSFET 601 is made gentle by the drain-source parasitic capacitance of the main MOSFET 601 and the snubber capacitor 603. Then, ZVS becomes feasible and turn-off loss is reduced.

At time t6, thereafter, the voltage Vm of the main MOSFET 601 becomes equal to the sum of the voltage of the direct-current power source 1 and the voltage Vc of the smoothing capacitor 1602. Then the main diode 1601 is rendered conductive.

When the drain-source voltage of the MOSFET 601 rises, the voltage is applied to both ends of a series circuit of the auxiliary MOSFET 604 and the auxiliary inductor 1002b. Voltage is applied to the auxiliary inductor 1002b until charging of the drain-source parasitic capacitance of the auxiliary MOSFET 604 is completed and a current is passed through the auxiliary inductor 1002b. When the voltage Vs across the auxiliary MOSFET 604 becomes equal to the sum of the voltage of the direct-current power source 1 and the voltage Vc of the smoothing capacitor 1602 at time t7, the auxiliary diode 1603 is rendered conductive.

At time t7, subsequently, voltage positive on the point q side is produced in the auxiliary inductor 1002b magnetically coupled with the main inductor 1002a and this voltage is applied to the leakage inductance component of the auxiliary inductor 1002b. The current of the auxiliary inductor 1002b is reduced and zeroed at time t7'. The subsequent operation after time t7' is the same as the operation before time t0.

The relation between the duty factor of the main MOSFET 601 and the boost-buck ratio in this embodiment is as indicated in FIG. 11.

Also in this embodiment, ZVS turn-on, ZCS turn-on, and ZVS turn-off can be implemented with respect to the main MOSFET 601 and ZCS turn-on can be implemented with respect to the auxiliary MOSFET 604. This makes it possible to significantly reduce switching loss and thus it is possible to increase frequency and reduce the size and cost of the inductors and capacitors.

10th Embodiment

Figure 17:
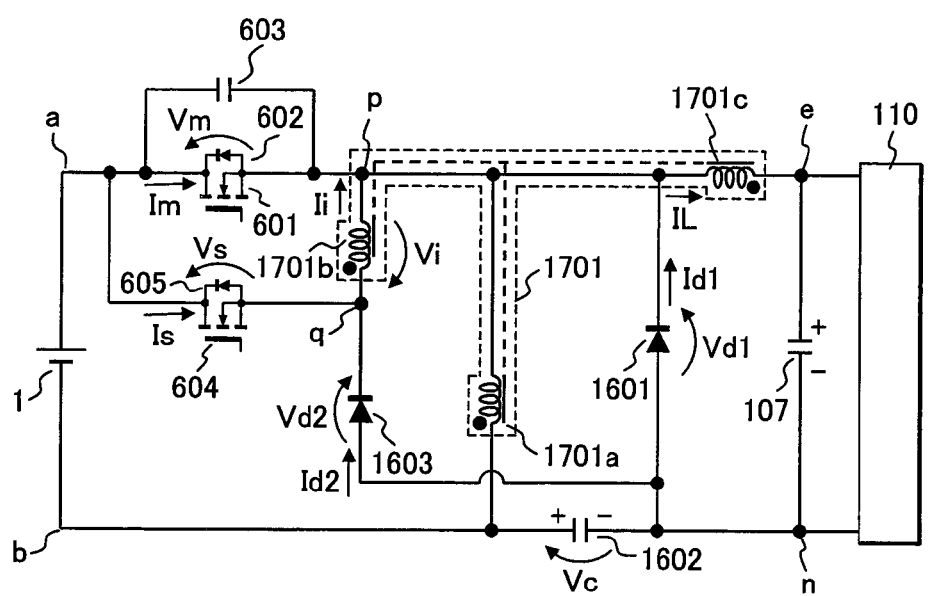
FIG. 17 is a circuitry diagram of a DC-DC converter in a 10th embodiment of the invention.

FIG. 17 is a circuitry diagram of a DC-DC converter in a 10th embodiment of the invention. This embodiment is a boost-buck soft switching DC-DC converter. In FIG. 17, the same components as in FIG. 16 will be marked with the same reference numerals and the description thereof will be omitted.

Description will be given to the circuitry in FIG. 17. A difference from the DC-DC converter in FIG. 16 is that: the inductor 1002 (a coupled inductor of the main inductor 1002a and the auxiliary inductor 1002b) and the smoothing inductor 1604 in FIG. 16 are magnetically coupled with each other to obtain an inductor 1701.

Description will be given to operation. The voltage and current waveform diagram of each part is as indicated in FIG. 15. Hereafter, description will be given with reference to FIG. 15.

The operation is the same as that in the ninth embodiment. Also in this embodiment, a main inductor 1701a, an auxiliary inductor 1701b, and a smoothing inductor 1701c are coupled together as in the eighth embodiment and a ripple current passed through the above inductor is thereby reduced. In conjunction therewith the peak current values of the current Im of the main MOSFET 601 and the current Id1 of the main diode 1601 are reduced. For this reason, the loss in each element is reduced.

Description will be given to the reason why the main inductor 1701a and the smoothing inductor 1701c can be coupled with each other and the effect of the coupling. When the main MOSFET 601 is on, a current is passed through the main inductor 1701a in the loop of the direct-current power source 1→the main MOSFET 601→the main inductor 1701a; and a current is passed through the smoothing inductor 1701c in the loop of the direct-current power source 1→the main MOSFET 601→the smoothing inductor 1701c→the output capacitor 107→the smoothing capacitor 1602. Since the voltage of the smoothing capacitor 1602 is equal to the voltage of the output capacitor 107 as output voltage, it can be considered that the voltage of the direct-current power source 1 is similarly applied to the main inductor 1701a and to the smoothing inductor 1701c. When the main MOSFET 601 is off, a current is passed through the main inductor 1701a in the loop of the main inductor 1701a→the smoothing capacitor 1602→the main diode 1601; and a current is passed through the smoothing inductor 1701c in the loop of the smoothing inductor 1701c→the output capacitor 107→the main diode 1601.

Since the voltage of the smoothing capacitor 1602 is equal to the voltage of the output capacitor 107 as output voltage, it can be considered that the voltage of the output capacitor 107 is similarly applied to the main inductor 1701a and to the smoothing inductor 1701c. The on-voltages of the main MOSFET 601 and the main diode 1601 are slight as compared with the voltage of the direct-current power source 1 and the like and thus they are disregarded.

As mentioned above, equal voltages are respectively applied to the main inductor 1701a and the smoothing inductor 1701c. When they are magnetically coupled with each other with the directions of voltage application made homopolar, therefore, this is equivalent to that their inductance values are increased by the action of mutual inductance. This reduces the ripple currents of the main inductor 1701a and the smoothing inductor 1701c. As the result of the reduction of ripple currents, change of magnetic flux in the core is also reduced and core loss can also be reduced. Meanwhile, ones of the respective windings of the main inductor 1701a, auxiliary inductor 1701b, and smoothing inductor 1701c are at the same potential. Because of this, it is unnecessary to provide an insulation distance at the terminals at the same potential of the respective windings when these inductors are formed on one and the same core; therefore, the inductors can be formed in small size.

The relation between the duty factor of the main MOSFET 601 and the boost-buck ratio in this embodiment is as indicated in FIG. 11 like that in the seventh embodiment.

In this embodiment, the inductors can be further reduced in size as compared with the ninth embodiment. Since the loss in the inductors as well as the loss in the switching elements can be reduced, the further enhancement of efficiency and the further cost reduction can be achieved.

11th Embodiment

Figure 18:
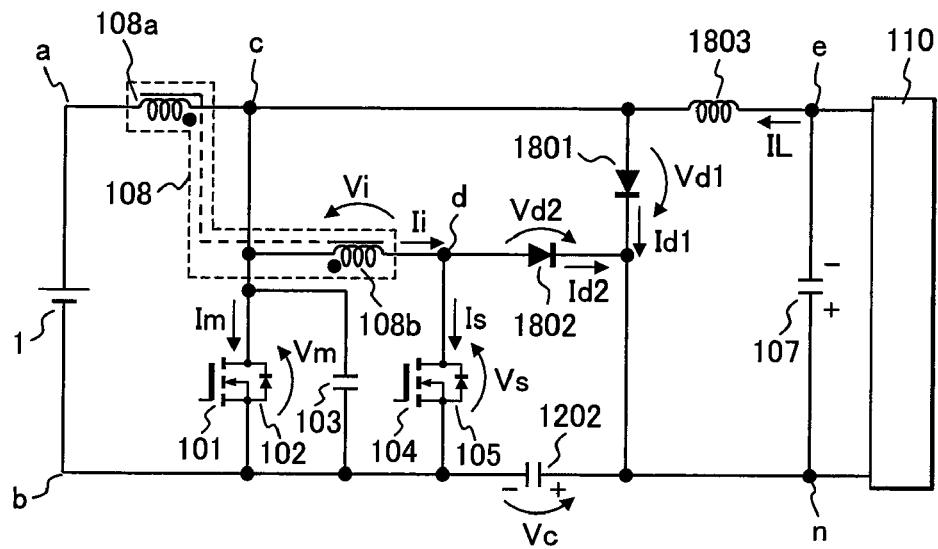
FIG. 18 is a circuitry diagram of a DC-DC converter in an 11th embodiment of the invention.

FIG. 18 is a circuitry diagram of a DC-DC converter in an 11th embodiment of the invention. This embodiment is an output inverting boost-buck soft switching DC-DC converter. In FIG. 18, the same components as in FIG. 12 will be marked with the same reference numerals and the description thereof will be omitted.

Description will be given to the circuitry in FIG. 18. A difference form the DC-DC converter in FIG. 12 is that: the positions of the main diode 106 and the smoothing inductor 1201 in FIG. 12 are reversed in FIG. 18; and in FIG. 18, they are newly designated as main diode 1801 and smoothing inductor 1803. Another difference is as follows: in FIG. 12, the cathode of the auxiliary diode 109 is connected to point e of the output capacitor 107; and in FIG. 18, the auxiliary diode is designated as auxiliary diode 1802 and its cathode is connected to point n of the output capacitor 107.

Description will be given to operation. The voltage and current waveform diagram of each part is as indicated in FIG. 13. Hereafter, description will be given to operation with reference to FIG. 13.

Before time t0, the main MOSFET 101 and the auxiliary MOSFET 104 are off. At this time, a current flows in the loop of the direct-current power source 1→the main inductor 108a→the main diode 1801→the smoothing capacitor 1202. At this time, in the smoothing capacitor 1202, voltage Vc positive on the point n side is produced. The relation between this voltage Vc and the duty ratio of the main MOSFET 101 is as indicated in FIG. 4. That is, the voltage of the smoothing capacitor 1202 is equal to the output voltage of the boost DC-DC converter in FIG. 1. At the same time, a current flows back in the loop of the smoothing inductor 1803→the main diode 1801→the output capacitor 107. That is, negative voltage is outputted at point e relative to point n on the output side. At this time, voltage positive on the point c side is produced in the auxiliary inductor 108b. This voltage reversely biases the auxiliary diode 1802 through the main diode 1801.

When the auxiliary MOSFET 104 is subsequently turned on at time t0, a current starts to flow in the loop of the direct-current power source 1→the main inductor 108a→the auxiliary inductor 108b→the auxiliary MOSFET 104. At this time, the auxiliary inductor current Ii is gently increased and the current Id1 of the main diode 1801 is gently reduced. Therefore, the auxiliary MOSFET 104 carries out ZCS when it is turned on and the production of loss is reduced.

From time t1, the electric charges charged in the drain-source parasitic capacitance of the main MOSFET 101 and the snubber capacitor 103 are discharged through the auxiliary inductor 108b and the auxiliary MOSFET 104. Then this energy is stored in the auxiliary inductor 108b. At time t2, the voltage Vm of the main MOSFET 101 drops to 0V. At the same time, voltage is applied from the smoothing capacitor 1202 to a series circuit of the output capacitor 107 and the smoothing inductor 1803 and the current IL of the smoothing inductor 1803 conversely starts to increase.

From time t2, subsequently, the auxiliary inductor 108b passes current Is in the loop of the auxiliary inductor 108b→the auxiliary MOSFET 104→the diode 102 by the energy stored during the period from time t0 to time t2. At time t3, subsequently, the driving signal of the main MOSFET 101 is turned on and the driving signal of the auxiliary MOSFET 104 is turned off. Either of turn-on of the main MOSFET 101 and turn-off of the auxiliary MOSFET 104 may be carried out first as long as they are carried out during the period during which a current is flowing in the diode 102. This period includes time t2 immediately after the voltage Vm of the main MOSFET 101 drops to 0V. This makes it possible for the main MOSFET 101 to carry out ZVS and ZCS and thus switching loss arising from turn-on of the main MOSFET 101 is not produced. When the period from time t2 to time t3 is made shorter, the period during which current is passed through the diode 102 is shortened and the production of loss can be reduced.

When the driving signal of the auxiliary MOSFET 104 is turned off at time t3, the current Im of the main MOSFET 101 conversely starts to increase. The auxiliary inductor 108b passes the auxiliary diode current Id2 in the loop of the auxiliary inductor 108b→the auxiliary diode 1802→the smoothing capacitor 1202→the main MOSFET 101 by the energy stored in itself. The energy stored in the auxiliary inductor 108b is discharged to the smoothing capacitor 1202 by the above-mentioned operation and simultaneously the current Id2 is reduced. When the energy is completely discharged, Id2 is zeroed and thereafter, the auxiliary diode 1802 enters a reverse recovery period and a recovery current flows. Since the auxiliary inductor 108b exists on the current loop of this recovery current, the recovery current does not become so large as to pose a problem in terms of circuit operation.

At time t4, subsequently, the recovery of the auxiliary diode 1802 is completed and the auxiliary diode 1802 is rendered non-conductive. Then the current hitherto passed through the auxiliary inductor 108b flows in the loop of the auxiliary inductor 108b→the main MOSFET 101→the diode 105. At this time, in the auxiliary inductor 108b magnetically coupled with the main inductor 108a, voltage positive on the point d side is produced and this voltage is applied to the leakage inductance component of the auxiliary inductor 108b. The current passed through the auxiliary inductor 108b is reduced and zeroed at time t4'. At the same time a current flows in the loop of the direct-current power source 1→the main inductor 108a→the main MOSFET 101 and this current is increased.

When the gate driving signal of the main MOSFET 101 is subsequently turned off and the current Im of the main MOSFET 101 is interrupted at time t5, the following takes place during the period from time t5 to time t6: the voltage Vm of the main MOSFET 101 is increased by dv/dt, which is determined by interrupting current, the drain-source parasitic capacitance of the main MOSFET 101, and the capacitance of the snubber capacitor 103. That is, dv/dt of the voltage Vm of the main MOSFET 101 is made gentle by the drain-source parasitic capacitance of the main MOSFET 101 and the snubber capacitor 103. Then ZVS becomes feasible and turn-off loss is reduced.

At time t6, thereafter, the voltage Vm of the main MOSFET 101 becomes equal to the voltage Vc of the smoothing capacitor 1202. Then the main diode 1801 is rendered conductive.

When the drain-source voltage of the main MOSFET 101 rises, the voltage is applied to both ends of a series circuit of the auxiliary inductor 108b and the auxiliary MOSFET 104. Voltage is applied to the auxiliary inductor 108b until charging of the drain-source parasitic capacitance of the auxiliary MOSFET 104 is completed and a current is passed through the auxiliary inductor 108b. When the voltage Vs across the auxiliary MOSFET 104 becomes equal to the voltage Vc of the smoothing capacitor 1202 at time t7, the auxiliary diode 1802 is rendered conductive.

At time t7, subsequently, voltage positive on the point c side is produced in the auxiliary inductor 108b magnetically coupled with the main inductor 108a and this voltage is applied to the leakage inductance component of the auxiliary inductor 108b. The current of the auxiliary inductor 108b is reduced and zeroed at time t7'. The subsequent operation after time t7' is the same as the operation before time t0. The relation between the duty factor of the main MOSFET 101 and the boost-buck ratio in this embodiment is as indicated in FIG. 11.

Also in this embodiment, ZVS turn-on, ZCS turn-on, and ZVS turn-off can be implemented with respect to the main MOSFET 101 and ZCS turn-on can be implemented with respect to the auxiliary MOSFET 104. This makes it possible to significantly reduce switching loss and thus it is possible to increase frequency and reduce the size and cost of the inductors and capacitors.

12th Embodiment

Figure 19:
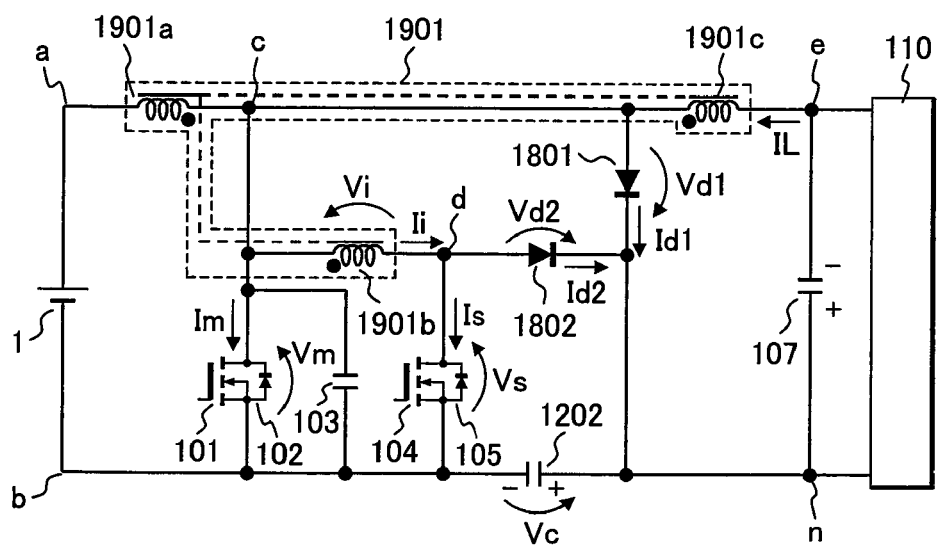
FIG. 19 is a circuitry diagram of a DC-DC converter in a 12th embodiment of the invention.

FIG. 19 is a circuitry diagram of a DC-DC converter in a 12th embodiment of the invention. This embodiment is an output inverting boost-buck soft switching DC-DC converter. In FIG. 19, the same components as in FIG. 18 will be marked with the same reference numerals and the description thereof will be omitted.

Description will be given to the circuitry in FIG. 19. A difference from the DC-DC converter in FIG. 19 is that: the inductor 108 (a coupled inductor of the main inductor 108a and the auxiliary inductor 108b) and the smoothing inductor 1803 in FIG. 18 are magnetically coupled with each other to obtain an inductor 1901. Description will be given to operation. The voltage and current waveform diagram of each part is as indicated in FIG. 15. Hereafter, description will be given to operation with reference to FIG. 15.

The operation is the same as that in the 11th embodiment. Since a main inductor 1901a and a smoothing inductor 1901c are coupled with each other, a ripple current passed through the above inductor is reduced. In conjunction therewith, the peak current values of the current Im of the main MOSFET 101 and the current Id1 of the main diode 106 are reduced. For this reason, the loss in each element is reduced.

Description will be given to the reason why the main inductor 1901a and the smoothing inductor 1901c can be coupled with each other and the effect of the coupling. When the main MOSFET 101 is on, a current is passed through the main inductor 1901a in the loop of the direct-current power source 1→the main inductor 1901a→the main MOSFET 101; and a current is passed through the smoothing inductor 1901c in the loop of the smoothing capacitor 1202→the output capacitor 107→the smoothing inductor 1901c→the main MOSFET 101. Therefore, the voltage of the direct-current power source 1 is applied to the main inductor 1901a. Consideration will be given to voltage applied to the smoothing inductor 1901c. Letting the voltage of the direct-current power source 1 be Vin and the duty factor of the main MOSFET 101 be d, the voltage Vc of the smoothing capacitor 1202 is obtained by Expression (1) below:

$$Vc = 1/(1-d) \times V\text{in} \quad (1)$$

Letting the voltage of the output capacitor 107 as output voltage be Vo, Expression (2) is obtained.

$$Vo = d/(1-d) \times V\text{in} \quad (2)$$

Letting the voltage across the smoothing inductor 1901c be VL1901c, Expression (3) is obtained.

$$VL1901c = Vc - Vo = V\text{in} \quad (3)$$

According to Expression (3), the voltage across the smoothing inductor 1901c is also equal to the voltage of the direct-current power source 1. That is, it can be considered that the voltage of the direct-current power source 1 is similarly applied to the main inductor 1901a and to the smoothing inductor 1901c. When the main MOSFET 101 is off, a current is passed through the main inductor 1901a in the loop of the direct-current power source 1→the main inductor 1901a→the main diode 1801→the smoothing capacitor 1202; and a current is passed through the smoothing inductor 1901c in the loop of the smoothing inductor 1901c→the main diode 1801→the output capacitor 107. Letting the voltage across the main inductor 1901a at this time be VL1901a, Expression (4) is obtained.

$$VL1901a = Vc - V\text{in} = d/(1-d) \times V\text{in} = Vo \quad (4)$$

That is, it can be considered that the voltage Vo of the output capacitor 107 as output voltage is applied to the main inductor 1901a. Similarly, the voltage Vo of the output capacitor 107 is applied to the smoothing inductor 1901c. The on-voltages of the main MOSFET 101 and the main diode 1801 are slight as compared with the voltage of the direct-current power source 1 and the like and thus they are disregarded.

As mentioned above, equal voltages are respectively applied to the main inductor 1901a and the smoothing inductor 1901c. When they are magnetically coupled with each other with the directions of voltage application made homopolar, therefore, this is equivalent to that their inductance values are increased by the action of mutual inductance. This reduces the ripple currents of the main inductor 1901a and the smoothing inductor 1901c. As the result of the reduction of ripple currents, change of magnetic flux in the core is also reduced and core loss can also be reduced. Meanwhile, ones of the respective windings of the main inductor 1901a, auxiliary inductor 1901b, and smoothing inductor 1901c are at the same potential. Because of this, it is unnecessary to provide an insulation distance at the terminals at the same potential of the respective windings when these inductors are formed on one and the same core; therefore, the inductors can be formed in small size.

The relation between the duty factor of the main MOSFET 101 and the boost-buck ratio in this embodiment is as indicated in FIG. 11 like that in the seventh embodiment.

In this embodiment, the inductors can be further reduced in size as compared with the 11th embodiment. Since the loss in the inductors as well as the loss in the switching elements can be reduced, the further enhancement of efficiency and the further cost reduction can be achieved.

In the description of the above embodiments, cases where MOSFETs are adopted as switching elements have been taken as examples. However, the switching elements in the DC-DC converters of the invention need not be MOSFETs and IGBTs and other insulated gate semiconductor devices and bipolar transistors can be adopted. Also in these cases, it will be understood by those skilled in the art that the same effect can be obtained. It is advisable to select switching elements as follows. Main switching elements can carry out soft switching both when they are turned on and when they are turned off. In large-current applications, therefore, use of IGBT low in saturation voltage may sometimes reduce the production of loss more. Meanwhile, auxiliary switching elements are small in the amount of current passed through the elements. Therefore, MOSFETs, which are generally lower in current capacity than IGBTs, are acceptable.

The parasitic capacitance of the main MOSFETs 101, 601 can be used in place of the snubber capacitors 103, 603. Similarly, the body diodes of the main MOSFETs and the auxiliary MOSFETs can be respectively used in place of the diodes 102, and the diodes 105, 605.

The invention can be utilized for power supply circuits in a wide range of fields, including home electric appliances, information equipment, automobile equipment, and the like.

What is claimed is:

1. A DC-DC converter comprising:
 a main switching element storing energy from a direct-current power source in a main inductor;
 a diode connected in inverse parallel with the main switching element;
 a main diode discharging energy stored in the main inductor to the output side; and
 an auxiliary circuit discharging the electric charges of a capacitance between ends of the main switching element during a short period including when the main switching element is turned on, wherein the auxiliary circuit includes:
 an auxiliary inductor magnetically coupled with the main inductor;
 an auxiliary switching element storing energy in the auxiliary inductor; and
 an auxiliary diode discharging energy stored in the auxiliary inductor to the direct-current power source or the output side,
 wherein the auxiliary inductor is coupled with the main inductor in a direction in which backward voltage is applied to the auxiliary diode when the main inductor discharges energy.

2. The DC-DC converter according to claim 1,
wherein the direct-current power source is connected in series with the main inductor and the main switching element;
wherein the main diode and an output capacitor are connected in series between the ends of the main switching element;
wherein the auxiliary inductor and the auxiliary switching element are connected in series between the ends of the main switching element; and
wherein the auxiliary diode is connected between a junction point between the auxiliary inductor and the auxiliary switching element, and a junction point between the main diode and the output capacitor.

3. The DC-DC converter according to claim 1,
wherein the direct-current power source is connected in series with the main switching element and the main diode;
wherein the main inductor and an output capacitor are connected in series between ends of the main diode;
wherein the auxiliary switching element and the auxiliary inductor are connected in series between the ends of the main switching element; and
wherein the auxiliary diode is connected between a junction point between the auxiliary switching element and the auxiliary inductor, and a negative pole of the direct-current power source.

4. The DC-DC converter according to claim 2,
wherein a second DC-DC converter is connected to a stage subsequent to the DC-DC converter,
wherein the second DC-DC converter has input terminals thereof connected in series with a second main switching element and a second main diode,
wherein a second main inductor and a second output capacitor are connected in series between ends of the second main diode,
wherein a second auxiliary switching element and a second auxiliary inductor are connected in series between ends of the second main switching element; and
wherein a second auxiliary diode is connected between a junction point between the second auxiliary switching element and the second auxiliary inductor, and a negative pole side of the input terminals.

5. The DC-DC converter according to claim 3,
wherein a third DC-DC converter provided with a first reverse-flow prevention diode in series with the auxiliary switching element of the DC-DC converter and sharingly using the main inductor of the DC-DC converter is connected to a subsequent stage,
wherein the third DC-DC converter is connected in series with the sharingly used main inductor and a third main switching element,
wherein a third main diode and a third output capacitor are connected in series between ends of the third main switching element,
wherein a third auxiliary inductor and a third auxiliary switching element are connected in series between the ends of the third main switching element,
wherein the third auxiliary diode is connected between a junction point between the third auxiliary inductor and the third auxiliary switching element, and a junction point between the third main diode and the third output capacitor, and
wherein a second reverse-flow prevention diode is provided in series with the third auxiliary switching element.

6. The DC-DC converter according to claim 1,
wherein the direct-current power source is connected in series with the main switching element and the main inductor,
wherein the main diode and an output capacitor are connected in series between ends of the main inductor,
wherein the auxiliary switching element and the auxiliary inductor are connected in series between the ends of the main switching element, and
wherein the auxiliary diode is connected between the junction point between the auxiliary switching element and the auxiliary inductor and the junction point between the main diode and the output capacitor.

7. The DC-DC converter according to claim 1, further comprising:
a smoothing capacitor storing the energy of the main inductor; and
a smoothing inductor discharging energy stored in the smoothing capacitor to the output side, wherein the smoothing capacitor exists on a path for discharging energy stored in the auxiliary inductor.

8. The DC-DC converter according to claim 7,
wherein the main inductor, the auxiliary inductor, and the smoothing inductor have such a winding structure that one-side terminals of these inductors are at a same potential, and
wherein the smoothing inductor is coupled in the direction in which energy is discharged to the output side when the main inductor discharges energy.

9. The DC-DC converter according to claim 7,
wherein the direct-current power source is connected in series with the main inductor and the main switching element,
wherein the smoothing inductor and the smoothing capacitor are connected in series between the ends of the main switching element,
wherein the main diode and an output capacitor are connected in series between the ends of the smoothing inductor,
wherein the auxiliary inductor and the auxiliary switching element are connected in series between the ends of the main switching element, and
wherein the auxiliary diode is connected between a junction point between the auxiliary inductor and the auxiliary switching element, and a junction point between the main diode and the output capacitor.

10. The DC-DC converter according to claim 7,
wherein the direct-current power source is connected in series with the main switching element and the main inductor,
wherein the main diode and the smoothing capacitor are connected in series between the ends of the main inductor,
wherein the smoothing inductor and an output capacitor are connected in series between the ends of the main diode,
wherein the auxiliary switching element and the auxiliary inductor are connected in series between the ends of the main switching element, and
wherein the auxiliary diode is connected between a junction point between the auxiliary switching element and the auxiliary inductor, and a junction point between the main diode and the smoothing capacitor.

11. The DC-DC converter according to claim 7,
wherein the direct-current power source is connected in series between the main inductor and the main switching element, wherein the main diode and the smoothing capacitor are connected in series between the ends of the main switching element, wherein the smoothing inductor and an output capacitor are connected in series between the ends of the main diode, wherein the auxiliary inductor and the auxiliary switching element are connected in series between the ends of the main switching element, and wherein the auxiliary diode is connected between a junction point between the auxiliary inductor and the auxiliary switching element, and a junction point between the main diode and the smoothing capacitor.

12. The DC-DC converter according to claim 8, wherein the direct-current power source is connected in series with the main inductor and the main switching element, wherein the smoothing inductor and the smoothing capacitor are connected in series between the ends of the main switching element, wherein the main diode and an output capacitor are connected in series between the ends of the smoothing inductor, wherein the auxiliary inductor and the auxiliary switching element are connected in series between the ends of the main switching element, and wherein the auxiliary diode is connected between a junction point between the auxiliary inductor and the auxiliary switching element and a junction point between the main diode and the output capacitor.

13. The DC-DC converter according to claim 8, wherein the direct-current power source is connected in series with the main switching element and the main inductor, wherein the main diode and the smoothing capacitor are connected in series between the ends of the main inductor, wherein the smoothing inductor and an output capacitor are connected in series between the ends of the main diode, wherein the auxiliary switching element and the auxiliary inductor are connected in series between the ends of the main switching element, and wherein the auxiliary diode is connected between a junction point between the auxiliary switching element and the auxiliary inductor, and a junction point between the main diode and the smoothing capacitor.

14. The DC-DC converter according to claim 8, wherein the direct-current power source is connected in series with the main inductor and the main switching element, wherein the main diode and the smoothing capacitor are connected in series between the ends of the main switching element, wherein the smoothing inductor and an output capacitor are connected in series between the ends of the main diode, wherein the auxiliary inductor and the auxiliary switching element are connected in series between the ends of the main switching element, and wherein the auxiliary diode is connected between a junction point between the auxiliary inductor and the auxiliary switching element, and a junction point between the main diode and the smoothing capacitor.

15. The DC-DC converter according to claim 1, further comprising a snubber capacitor connected between the ends of the main switching element.

16. The DC-DC converter according to claim 1, further comprising:

a voltage detecting means for detecting the voltage across the main switching element, wherein off time of the auxiliary switching element and on time of the main switching element are controlled based on a detection value thereof.

17. The DC-DC converter according to claim 1, further comprising:

a current detecting means for detecting a current passed through the main switching element and the diode connected in inverse parallel therewith, wherein off time of the auxiliary switching element and on time of the main switching element are controlled based on a detection value thereof.

18. The DC-DC converter according to claim 1, further comprising:

a voltage detecting means for detecting the voltage across the main inductor or the auxiliary inductor, wherein off time of the auxiliary switching element and on time of the main switching element are controlled based on a detection value thereof.

19. The DC-DC converter according to claim 1, further comprising:

an input voltage detecting means for detecting the voltage of the direct-current power source;

a voltage detecting means for detecting the voltage across the main switching element; and an output voltage detecting means, wherein off time of the auxiliary switching element and on time of the main switching element are controlled based on detection values of at least two of the input voltage detecting means, the detecting means for the voltage across the main switching element, and the output voltage detecting means.

20. The DC-DC converter according to claim 1, wherein the direct-current power source includes:

an alternating-current power source, a rectifying circuit, and a filter circuit;

an input voltage detecting means;

an input current detecting means for detecting a current from the direct-current power source; and an output voltage detecting means, wherein the power factor of the alternating-current power source is controlled.

* * * * *